US 11,088,550 B2

(12) United States Patent
Jaensch et al.

(10) Patent No.: US 11,088,550 B2
(45) Date of Patent: Aug. 10, 2021

(54) VEHICLE HAVING AN ENERGY STORAGE ELEMENT

(71) Applicant: Dr. Ing. h.c. F. Porsche Aktiengesellschaft, Stuttgart (DE)

(72) Inventors: Malte Jaensch, Bietigheim-Bissingen (DE); Jan Kacetl, Gemmrigheim (DE); Tomas Kacetl, Gemmrigheim (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 205 days.

(21) Appl. No.: 16/353,430

(22) Filed: Mar. 14, 2019

(65) Prior Publication Data
US 2019/0288526 A1  Sep. 19, 2019

(30) Foreign Application Priority Data

Mar. 19, 2018 (DE) .................... 102018106306.7

(51) Int. Cl.
*H02J 7/00* (2006.01)
*H02J 7/02* (2016.01)
(Continued)

(52) U.S. Cl.
CPC ............ *H02J 7/0024* (2013.01); *B60L 53/24* (2019.02); *H01M 10/46* (2013.01); *H02J 7/022* (2013.01);
(Continued)

(58) Field of Classification Search
CPC ........ H02J 7/0024; H02J 7/022; B60L 53/24; B60L 50/66; B60L 2210/10; B60L 2210/30; H01M 10/46; H02P 27/08
(Continued)

(56) References Cited

U.S. PATENT DOCUMENTS 6,140,799 A * 10/2000 Thomasson ........... H02J 7/0024
320/117
7,855,906 B2 * 12/2010 Klodowski etal. ...... H02M 7/48
363/97
(Continued)

FOREIGN PATENT DOCUMENTS

DE  102010041046 A1  3/2012
DE  102010052934 A1  5/2012
(Continued)

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015—pp. 203-215.
(Continued)

*Primary Examiner* — Sun J Lin
(74) *Attorney, Agent, or Firm* — RatnerPrestia

(57) ABSTRACT

A vehicle having an energy storage element including a drive inverter and a charging unit. The energy storage element further includes a first control apparatus, modules, an interconnection apparatus, and two first poles, the drive inverter is connected to said two first poles. Each modules of said modules has an energy storage unit. The interconnection apparatus has connections between the modules and first switches provided on the connections in order to allow different interconnections of the modules and different voltages at the first poles based on a state at the first switches. Different interconnections of the modules allow at least two interconnections from the group of interconnections. The first control apparatus is configured to actuate the interconnection apparatus based on a voltage setpoint value in order to influence the different voltages at the two first poles based on the voltage setpoint value.

20 Claims, 19 Drawing Sheets

(51) Int. Cl.
*B60L 53/24* (2019.01)
*H02P 27/08* (2006.01)
*H01M 10/46* (2006.01)
*H02P 5/74* (2006.01)
*H02P 27/14* (2006.01)
*B60L 50/60* (2019.01)

(52) U.S. Cl.
CPC ............... *H02P 5/74* (2013.01); *H02P 27/08* (2013.01); *H02P 27/14* (2013.01); *B60L 50/66* (2019.02); *B60L 2210/10* (2013.01); *B60L 2210/30* (2013.01); *H01M 2220/20* (2013.01)

(58) Field of Classification Search
USPC ........................................................ 320/109
See application file for complete search history.

(56) References Cited

U.S. PATENT DOCUMENTS

| | | | |
|---|---|---|---|
| 9,024,560 | B2 | 5/2015 | Fink |
| 9,496,799 | B2 | 11/2016 | Goetz et al. |
| 10,416,201 | B2 * | 9/2019 | Zimmermann et al. .................... G01R 19/02 |
| 2006/0152085 | A1 * | 7/2006 | Flett et al. .............. H02M 7/487 307/75 |
| 2008/0197810 | A1 * | 8/2008 | Ishikawa et al. ........ B60L 58/10 320/135 |
| 2010/0261043 | A1 | 10/2010 | Kim et al. |
| 2011/0001442 | A1 | 1/2011 | Lee et al. |
| 2014/0183939 | A1 | 7/2014 | Jiang et al. |
| 2018/0212530 | A1 | 7/2018 | Götz |
| 2018/0219478 | A1 | 8/2018 | Götz |

FOREIGN PATENT DOCUMENTS

| | | |
|---|---|---|
| DE | 102011108920 A1 | 1/2013 |
| EP | 2879266 A1 | 6/2015 |
| WO | 2016174117 A1 | 11/2016 |
| WO | 2017016674 A1 | 2/2017 |
| WO | 2017016675 A1 | 2/2017 |

OTHER PUBLICATIONS

Perez et al., "Circuit Topologies, Modeling, Control Schemes, and Applications of Modular Multilevel Converters", IEEE Transactions on Power Electronics, vol. 30, No. 1, Jan. 2015—pp. 4-17.

* cited by examiner

VEHICLE HAVING AN ENERGY STORAGE ELEMENT

CROSS-REFERENCE TO RELATED APPLICATION

This application claims priority to German Patent Application No. DE 10 2018 106 306.7, filed Mar. 19, 2018, which is incorporated by reference herein in its entirety.

FIELD OF THE INVENTION

The invention relates to a vehicle having an energy storage element.

BACKGROUND OF THE INVENTION

Conventional electric vehicles (battery electric vehicles, hybrid vehicles, fuel cell vehicles, etc.) normally have a large energy storage element (e.g., battery) comprising individual cells hardwired in a prescribed series/parallel configuration. The hardwiring determines the maximum voltage of the system with a fully charged battery (or an optimum concentration of the educts in the case of fuel cells). If the state of charge of the battery falls or if the load current rises sharply or to high values, the voltage of the hardwired battery pack can decrease by up to 50%.

Many vehicles therefore use a DC/DC converter between the battery and the drive inverter(s) in order to raise the voltage and keep it as constant as possible regardless of the influences. However, the additional DC/DC converter produces considerable additional losses, takes up installation space and increases the total weight of the vehicle and the costs of manufacture. Further, as a high-power clocked converter, it causes considerable electromagnetic emissions that need to be filtered. Moreover, the DC/DC converter cannot solve a basic problem of hardwired battery packs: the production-related tolerances of battery and fuel cells are so large that the properties thereof, such as current capacity, loss response, internal resistance, time constants and capacities, but also aging, vary enormously.

In a hardwired battery pack, the weakest cell determines the properties of the overall battery (for example current capacity, heat generation, capacity, etc.). If the smallest cell is empty, discharge needs to be ended for all cells. If the cell having the greatest loss reaches its upper heat limit, it cannot be individually relieved of load, and the total load for all cells has to be decreased.

The more cells the battery pack comprises, the more likely it is that the performance of the battery pack is far below the average of all the battery cells. If a Gaussian distribution of the properties is assumed, the influence of the edges of the distribution becomes greater, since the likelihood of having some representatives of these edges in the battery pack increases.

The battery pack is normally charged using one or more separate chargers that convert the AC voltage (in Europe 230 V, in the USA 110 V or as a split-phase terminal 2×110 V=240 V) or three-phase current (400 V in Europe, various voltages between 208 V and 480 V in the USA, 575 V in Canada, etc.) into the DC voltage for the battery using charge control (current and/or voltage control). The fast charging stations that currently exist meet various standards and deliver different voltages, those at ~400 V DC voltage being dominant. In recent years, however, the battery voltages used in electric vehicles have been rising, for example at present to 800 V. The voltage of the charging stations of the currently available infrastructure is frequently not sufficient to charge such a battery. In order to be able to charge these batteries at charging stations with lower charging voltages, a high level of additional complexity is required, for example an additional high-power DC/DC voltage converter that adapts the voltage.

Further, the drive battery, which has a voltage of at present typically between 48 V and 1000 V, is for the most part the only or (in the case of hybrids) the most efficient energy source for other components in the vehicle. A number of independent power electronics components have to match the greatly fluctuating battery voltage to various other systems. The supply of power to the vehicle electrical systems, for example 12 V and/or 48 V (if the latter is not already the drive electrical system with the battery), even in the case of hybrids with internal combustion engines, is normally provided by the drive battery instead of via a generator or via a DC/DC voltage converter.

The motor(s) of electric vehicles today for propulsion are normally polyphase AC motors, often having three or more phases, and they require an inverter that converts the DC voltage of the battery into AC voltage. In this case, the voltage and frequency of the voltages and currents for the machine(s) changes constantly depending on the operating point (speed and acceleration), which means that constant readjustment is required.

Aging processes cause the voltage of the hardwired battery pack to fall over the course of time. At high load, the voltage also dips briefly (during a high load and for a few seconds to a few minutes, depending on battery type) until it returns to the decreasing trajectory again.

The drive inverter(s) produce the AC voltage for the drive machine(s) from the alternating DC voltage by means of switching modulation, for example pulse width modulation (PWM). Specifically at low amplitudes of the AC voltage far below the DC input voltage, however, the modulation index, provided by the maximum on-to-off ratio of the semiconductor switches in the inverter, becomes very small. With low modulation indices, the DC voltage falls to the low voltage level of the AC voltage, and the voltage and current quality of the AC voltage decreases in particular as a result of high current ripple amplitudes. Further, the control accuracy of the inverter decreases for low modulation indices, which means that the control quality falls and the operating point of the machine fluctuates or cannot be controlled in stable fashion. In inverters today, the PWM is normally controlled digitally, which means that temporal resolution capability is limited. In the case of 8-bit digital PWM, 256 levels are possible for the modulation index, for example, and accordingly 4096 in the case of 12-bit PWM. With very low modulation indices, it is no longer possible for a sinewave to be mapped exactly in this case and the modulation index itself still has quantization artefacts prior to conversion into a switched signal.

US 2010/261043 A1, which is incorporated by reference herein, discloses a reconfigurable battery system having a multiplicity of battery cells, in which each battery cell is connected to an adjacent battery cell via a multiplicity of switches. A control unit controls the switches in order to connect the battery cells in series or parallel in order to satisfy a particular output criterion.

US 2011/001442 A1, which is incorporated by reference herein, discloses a reconfigurable battery whose cells may be arranged in series or parallel in order to provide different output voltages.

US 2014/183939 A1, which is incorporated by reference herein, reveals a battery system that can provide an output voltage of 12 V and 48 V. A battery management system (BMS) selectively controls how many modules are connected and provides a lower power when current is not drawn from all modules.

WO 2016/174117 A1, which is incorporated by reference herein, discloses a battery having battery modules that can dynamically alternate between a series configuration and a parallel configuration in order to provide a DC voltage of 12 V, 24 V, 48 V or 60 V.

EP 2 879 266 A1, which is incorporated by reference herein, discloses dynamically altering a selection of battery cells in a cell stack in order to ensure a balanced discharge of the cells.

SUMMARY OF THE INVENTION

A vehicle has an energy storage element, a drive inverter and a charging unit. The energy storage element has a first control apparatus, modules, an interconnection apparatus and two first poles, to which first poles the drive inverter is connected. The modules each have an energy storage unit, and the interconnection apparatus has connections between the modules and first switches provided on the connections, in order to allow different interconnections of the modules and different voltages at the first poles on the basis of the state of the first switches. The different interconnections of the modules allow at least two interconnections from the group of interconnections consisting of parallel interconnection of two modules,
series interconnection of two modules,
bypassing of at least one module, and which first control apparatus is designed to actuate the interconnection apparatus on the basis of a voltage setpoint value in order to influence the voltage and the first poles on the basis of the voltage setpoint value.

Such an energy storage element, together with the drive inverter and the charging unit, forms an advantageous combination that allows firstly a high level of quality for the voltage at the poles and secondly also matching of the voltage to present requirements.

According to a preferred embodiment, the energy storage element in a vehicle has two second poles connectable to at least one of the energy storage units, wherein the maximum voltage at the second poles is lower than the maximum voltage at the first poles. The provision of second poles besides the first poles allows the energy storage element to deliver different voltages and hence to supply power to different loads at the same time. This saves space and weight.

According to a preferred embodiment, the maximum voltage at the second poles is 120 V or less. 120 V is the point at which the equivalent definition of protective low voltage in the industrial sector ends, and the voltage range to 120 V is thus preferred.

According to a preferred embodiment, the maximum voltage at the second poles is 60 V or less. The voltage of 60 V is below the protective low voltage according to different vehicle standards. It is thus not necessary for any safety regulations for this high voltage range to be used up to this voltage. This concerns in particular insulation, insulation distances, test voltages, contact safety and training and qualification of workers for manufacturing or repair. A voltage in the region of 48 V is particularly advantageous. This voltage is cited in the VDA 320 standard, for example, with a range from 20 V to 60 V being indicated as the undervoltage or overvoltage range to be tolerated if need be in order to include fluctuations in the battery voltage. A range from 36 V to 52 V without function restrictions and a range from 24 V to 54 V with possible function restrictions are likewise defined.

According to a preferred embodiment, the second poles are connectable to the at least one energy storage unit via the interconnection apparatus in order to influence the voltage at the two second poles via the first switches of the interconnection apparatus. As a result, the interconnection apparatus can be used twice, once for producing the voltage at the first poles and additionally also for the voltage at the second poles.

According to a preferred embodiment, the first control apparatus is designed to switch the interconnection apparatus alternately to and fro between a first state and a second state, in which first state the two second poles are connected to the at least one energy storage unit such that the at least one energy storage unit brings about a voltage at the two second poles, and in which second state the two second poles are interconnected such that the at least one energy storage unit brings about no voltage or a lower voltage at the two second poles, in order to provide, on average, a voltage at the two second poles that is lower than the voltage of the at least one energy storage unit in the first state. The individual energy storage units have a voltage of 20 V or 40 V, for example. To produce a voltage of 12 V, for example, it is thus advantageously possible to alternate between different states in order to bring about a correspondingly lower voltage on average. If a voltage of 48 V is supposed to be produced for a basic voltage of an energy storage unit of 20 V, for example, it is possible to alternate between a series connection of two and three energy storage units.

According to a preferred embodiment, the two second poles have a capacitor provided between them in order to smooth the voltage at the two second poles. In particular with a clocked interconnection of the energy storage units by the interconnection apparatus, the provision of the capacitor for smoothing the voltage is advantageous.

According to a preferred embodiment, the vehicle has a first DC/DC converter having first inputs and first outputs, which first inputs are connected to the two second poles directly or indirectly in order to provide an additional voltage at the first outputs, which additional voltage is preferably lower than the voltage at the two second poles. Provision of the DC/DC converter allows not only the voltage at the second poles but also an additional voltage to be produced. This facilitates interconnection within the energy storage element. Alternatively, the provision of two third poles on the energy storage element would also be possible, however.

According to a preferred embodiment, the first DC/DC converter has an isolating apparatus designed to bring about DC isolation between the first inputs and the first outputs. The isolating apparatus achieves safe isolation between the high-voltage energy storage element and, by way of example, a 12 V vehicle electrical system, and this increases safety.

According to a preferred embodiment, the isolating apparatus has a transformer or a capacitor. These components are particularly well suited to transmitting a power signal.

According to a preferred embodiment, the vehicle has a second control apparatus, and the drive inverter is connected to the second control apparatus via a first data line and is designed to transmit a first data signal to the second control apparatus, and the second control apparatus is designed to transmit a voltage setpoint value to the first control apparatus on the basis of the first data signal. The drive inverter is frequently the main load on the energy storage element in a vehicle. It is very advantageous if the drive inverter can influence the voltage of the energy source, since drive inverters usually have different optimum input voltages for different load at the output. The data signal can therefore improve the performance of the drive inverter.

According to a preferred embodiment, the vehicle has a second DC/DC converter having second inputs and second outputs, which second inputs are connected to the two second poles directly or indirectly, which second DC/DC converter is connected to the second control apparatus via a second data line and is designed to transmit a second data signal to the second control apparatus, and which second control apparatus is designed to prescribe a voltage setpoint value for the first control apparatus on the basis of the first data signal and the second data signal. It is advantageous that the second control apparatus is provided with data signals from different loads. It is thus possible for a voltage of the energy storage element that is advantageous for the overall system to be set in the second control apparatus.

According to a preferred embodiment, the charging unit has a charging terminal and an AC/DC converter having third inputs and third outputs, which third inputs are connected to the charging terminal, and which third outputs are connected to the first poles. The connection of the charging terminal to the poles allows suitable setting of the voltage of the energy storage element for charging.

According to a preferred embodiment, the third outputs and the first poles have a filter provided between them. Such a filter can be used to decrease an influence of the energy storage element and the external electrical system. Additionally, at least partial decoupling can be achieved between the voltage at the first poles and on the charging unit. This is advantageous if the form of the voltage on the charging unit is needed in order to regulate the charging current thereto.

According to a preferred embodiment, the charging unit has a current controller and a first measuring apparatus for generating a first signal on the basis of the level of the charging current, which current controller is supplied with a current controller setpoint value as setpoint value and with the first signal as actual value, which current controller outputs the voltage setpoint value to the first control apparatus as manipulated variable in order to regulate the actual value to the setpoint value. The influencing of the charging current by reconfiguration of the battery allows good efficiency and low losses, since an additional conversion of the voltage does not necessarily have to take place.

According to a preferred embodiment, the actual value is prescribed on the basis of the voltage at the third outputs. This has a positive influence on the power factor.

According to a preferred embodiment, a phase difference between the actual value and the voltage at the third outputs is prescribed in order to influence the power factor. If an electricity supply system has many capacitive loads connected to it, for example, it is advantageous to set the phase difference such that the vehicle acts as an inductive load. At the high powers, this option is very advantageous.

According to a preferred embodiment, the phase difference is prescribable for the current controller in the manner alterable by an encoder. As a result, the vehicle can react to present demands and, by way of example, perform appropriate setting for the phase difference if this is called for by the electricity supply system by means of a control signal or by the electricity supply system operator.

According to a preferred embodiment, the AC/DC converter is formed as a result of the drive inverter being used in the opposite direction for the charging process. The drive inverter is possibly already present in the vehicle, and it usually has all of the required functionality. This saves space, weight and costs.

According to a preferred embodiment, the charging terminal has a first terminal point for a neutral conductor, and the first terminal point is connected to the two first poles via diodes or via switches, in particular via semiconductor switches. This allows a preferred connection of a neutral conductor.

According to a preferred embodiment, the charging terminal has a first charging terminal unit for a DC voltage and a second charging terminal unit for an AC voltage, which first charging terminal unit is at least partially interconnected with the DC side of the drive inverter, and which second charging terminal unit is at least partially interconnected with the AC side of the drive inverter. This results in great flexibility for charging.

According to a preferred embodiment, the AC/DC converter has at least four paths in order to allow connection of either a three-phase AC signal or a single-phase AC signal. This allows the connection of different AC signals.

According to a preferred embodiment, the AC/DC converter is of active or passive design. The passive design is inexpensive, and the active design allows greater flexibility.

A reconfigurable energy storage element or a reconfigurable fuel cell in which the original hardwired electrical series/parallel interconnection is broken up and split into sub-units, each having multiple cells, which can in turn be dynamically rewired by means of suitable power electronics allows new areas of application and solutions.

The reconfigurable DC voltage battery can dynamically alternate its battery elements/sub-units/modules between series interconnection between adjacent battery elements, parallel interconnection of two or in particular more adjacent battery elements or bypassing of one or more battery elements.

The reconfigurable battery can perform various tasks using to some extent the same hardware at the same time by means of a suitable apparatus and associated control, for example supply of power to various units, operation of the sub-units thereof under ideal electrical, chemical and thermal conditions, charging of the battery in various modes from various sources and exchange of energy between battery elements.

Thus, the intelligent reconfigurable battery coordinates the electrical interconnection of the sub-units, for example, by taking into consideration the load current such that
  (i) the charge is equalized as an integral of the battery element current $i_{TB,j}$ of the module j with respect to time; and/or
  (ii) the lowest possible total resistance of the series/parallel combination is obtained for a prescribed voltage; and/or
  (iii) temperature hotspots, for example detected by at least one temperature sensor in each battery element, are suppressed, for example by decreasing the battery element current of the associated battery element(s); and/or
  (iv) aging of the battery elements, for example ascertained by an SOH estimation, is equalized.

BRIEF DESCRIPTION OF THE DRAWINGS

Further advantages and refinements of the invention emerge from the description and the accompanying drawings.

It goes without saying that the features cited above and those yet to be explained below can be used not only in the respectively indicated combination but also in other combinations or on their own without departing from the scope of the present invention. The invention is depicted schematically on the basis of embodiments in the drawings and is described schematically and in detail with reference to the drawings, in which.

DETAILED DESCRIPTION OF THE INVENTION

Figure 1:
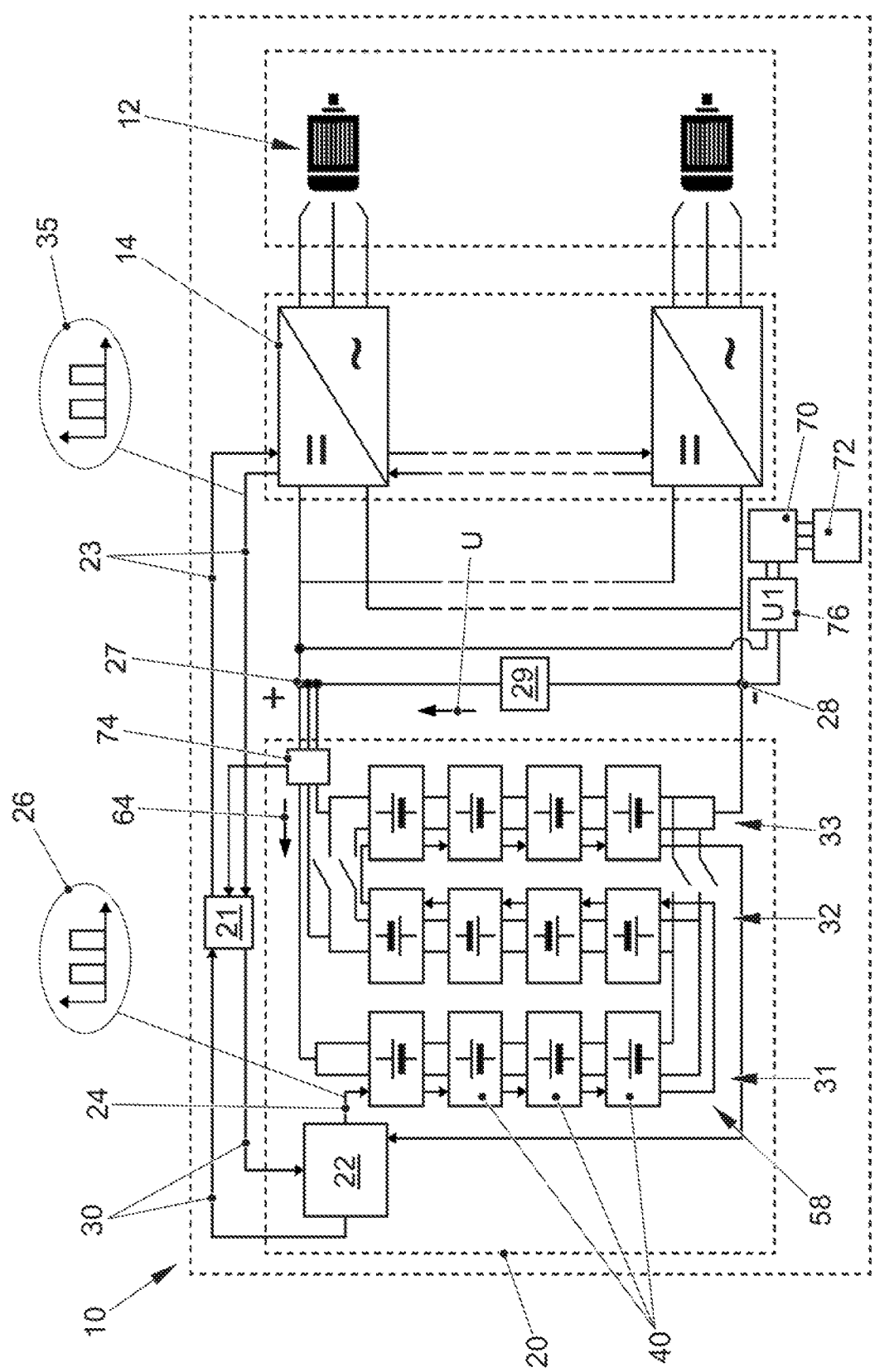
FIG. 1 shows a schematic depiction of an embodiment of an arrangement having an energy storage element, drive inverters and AC motors, of the battery system according to aspects of the invention.

In the drawings, identical reference signs denote the same components, and these are usually described only once.

FIG. 1 shows a vehicle 10, in particular an electric vehicle or a hybrid vehicle. An energy storage element 20 for providing a voltage is provided and, by way of example, electrically connectable to associated AC motors 12 via drive inverters or power inverters 14. The energy storage element 20 has a first control apparatus 22 and a plurality of modules 40, which modules 40 are interconnectable with one another in a manner reconfigurable by a switching apparatus 58 in order to set the voltage U at the poles 27, 28 of the energy storage element 20. A second control apparatus 21 is provided and is connected to the first control apparatus 22 via a data line 30. The second control apparatus 21 is superordinate to the first control apparatus 22 and can prescribe a voltage setpoint value U_S, for example, therefor. The second control apparatus 22 is connected to the drive inverter 14 via a data line 23 in order to be able to receive state data from said drive inverter, for example the temperature in the drive inverter 14, a required power or a desired voltage. The first control apparatus 22 is connected to the modules 40 via a data line 24 in order to be able to transmit control signals 26 to the modules 40. Preferably, the modules 40 can also communicate with one another via the data lines 24 or via an additional data line, not depicted. By way of example, the energy storage element 20 has a first path 31, a second path 32 and a third path 33. At least some of the paths 31, 32, 33 can be connected in series or interconnected in parallel with one another in order to provide different voltages U at the poles 27, 28 of the energy storage element 20.

As a result of the reconfigurability of the modules 40, the energy storage element 20 shown allows matching of the voltage U to the voltage setpoint value U_S, for example, and this allows the voltage U to be raised or lowered by reconfiguration when the state of charge of the modules 40 changes.

A charging unit 70 having a charging terminal 72 is provided in order to allow charging of the energy storage element 20. The charging unit 70 is connected to the poles 27, 28 in the exemplary embodiment. The charging terminal 72 is preferably, and are shown, in the form of a socket, but it can also be configured as a plug.

A measuring apparatus 29 for measuring the voltage at the poles 27, 28 is provided in order to produce a voltage value U and to output it as a signal to the first control apparatus 22 and/or the second control apparatus 21.

A measuring apparatus 74 for measuring the charging current for the energy source is provided in order to produce a current value I and to output it as a signal to the first control apparatus 22 and/or the second control apparatus 21. The current can be measured directly or indirectly, and preferably both the current 64 when the energy storage element 20 is charged and the current when the energy storage element 20 is discharged can be measured.

Figure 2:
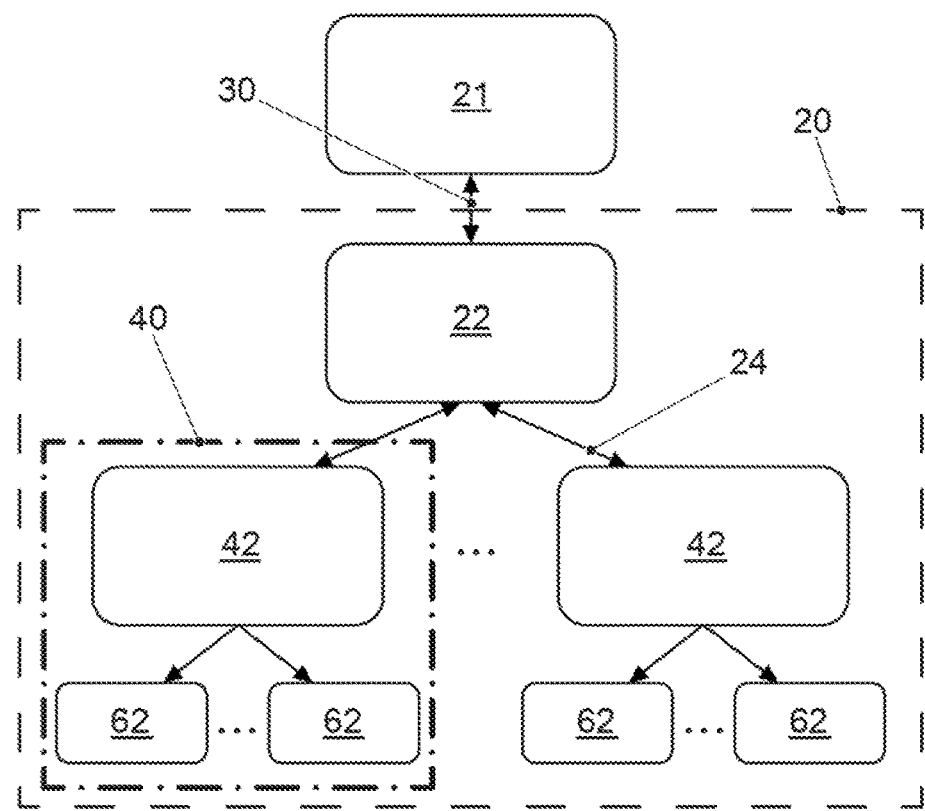
FIG. 2 shows a schematic depiction of a control structure for the energy storage element.

FIG. 2 shows the control structure. The vehicle control apparatus 21 is usually arranged outside the energy storage element 20, and it communicates with the first control apparatus 22 of the energy storage element 20. The vehicle control apparatus 21 transmits a voltage setpoint signal to the first control apparatus 22, for example, and the first control apparatus 22 transmits status and error values of the energy storage element 20, for example. The vehicle control apparatus 21 and the first control apparatus 22 have a data line 30 provided between them, for example a unidirectional or bidirectional bus. The first control apparatus 22 determines how the modules 40 are meant to be configured, and it uses the control line 24 to transmit appropriate signals to the module control apparatuses 42, which are each associated with one of the modules 40. The control line 24 is preferably a data line, in particular a unidirectional or bidirectional bus. The module control apparatus 42 transmits control signals to first switches 62, which first switches 62 are provided to activate or deactivate connections between battery modules 40, a useful current flowing via the first switches 62 when they are on. Preferably, the module control apparatus 42 has monitoring for the associated module (voltage, state of charge, temperature). Preferably, the module control apparatus 42 has a communication unit for communication with the first control apparatus 22 and/or with the other modules 40.

The module control apparatus 42 preferably has an ASIC (Application Specific Integrated Circuit), an FPGA (Field Programmable Gate Array), a CPLD (Complex Programmable Logic Device) or a microcontroller. Electronic components of this kind allow fast communication and can very quickly react to application-specific events and switch the first switches 62. This results in a high level of safety.

The first control apparatus 22 ascertains a suitable configuration for the interconnection units 60 and transmits to each interconnection unit 60 an applicable control signal suitable for the associated module 40. On the basis of this control signal, the module control apparatus 42 switches the first switches 62.

Figure 3:
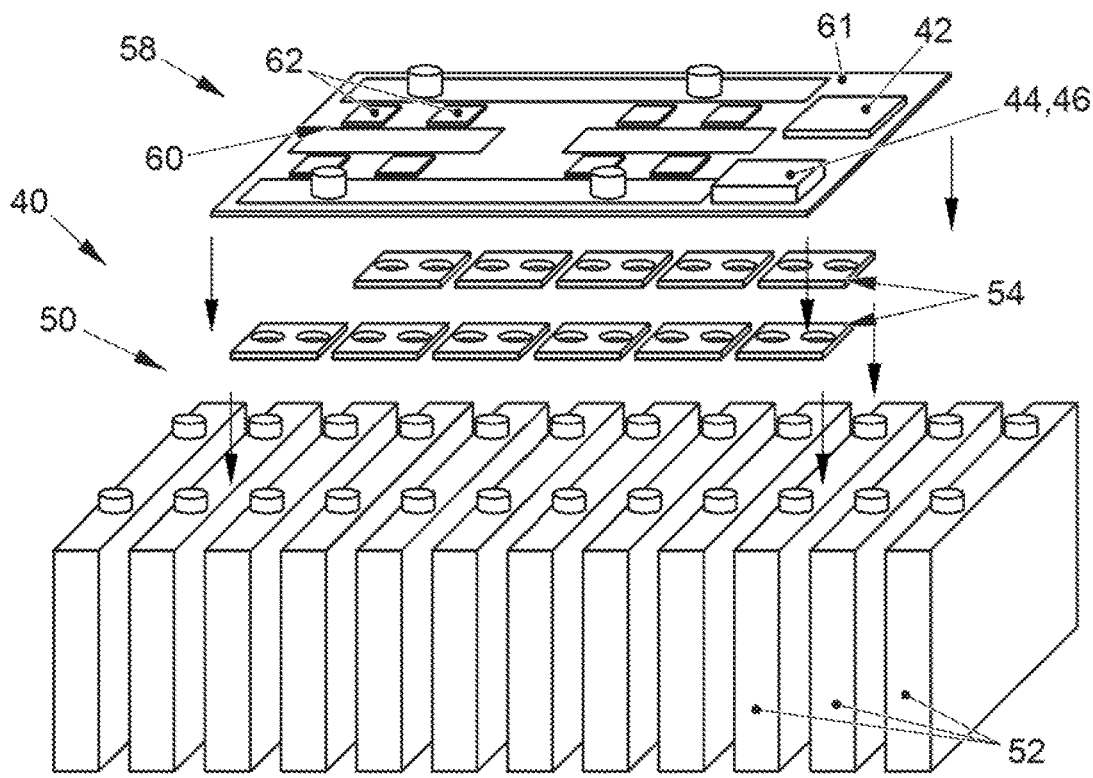
FIG. 3 shows an exploded depiction of a module of the energy storage element.

FIG. 3 shows a module 40. The module 40 has an energy storage unit 50, an interconnection unit 60 and an associated module control apparatus 42. The interconnection unit 60 forms a modular part of the interconnection apparatus 58, and it has the first switches 62. On the basis of the state of the first switches 62, interconnection of the module 40 with another module 40 is possible. To this end, the modules 40 are interconnected with one another to form the energy storage element 20, as a result of which the interconnection units 60 are interconnected between two associated modules 40.

The interconnection unit 60 preferably has a printed circuit board 61 on which the first switches 62 with connecting lines 63 and preferably also the module control apparatus 42 are provided.

Preferably, a measuring apparatus 44 for producing second measured values characterizing the voltage of the module 40 is provided. More preferably, a measuring apparatus 46 for producing third measured values characterizing the state of charge at the associated module 40 is provided. The arrangement of said elements on the printed circuit board 61 is preferred, but said elements can also be provided on another printed circuit board or without a printed circuit board.

The first control apparatus 22 from FIG. 2 and the module control apparatus 42 are together designed to allow the actuation of the associated interconnection unit 60 to be changed even during use of the energy storage element 20, so as to bring about reconfiguration of the energy storage element 20. In the exemplary embodiment, the energy storage unit 50 is constructed from battery cells 52 hardwired via an interconnection 54. In the exemplary embodiment, the battery cells 52 are connected in series by the interconnection 54 in order to obtain a prescribed basic voltage level. On the basis of the basic voltage of the battery cells 52, a parallel interconnection or a combined series and parallel interconnection is also possible. In the case of the battery cells 52, each battery cell 52 has its own energy tank. As an alternative to the battery cells 52, fuel cells, not depicted, can be used. In the case of fuel cells, it is possible to use a shared energy tank with the fuel, wherein the power converters of the fuel cells access the common energy tank. If the battery cells 52 or the fuel cells supply sufficient voltage, the energy storage unit 50 used can also be a single battery cell or fuel cell.

Figure 4:
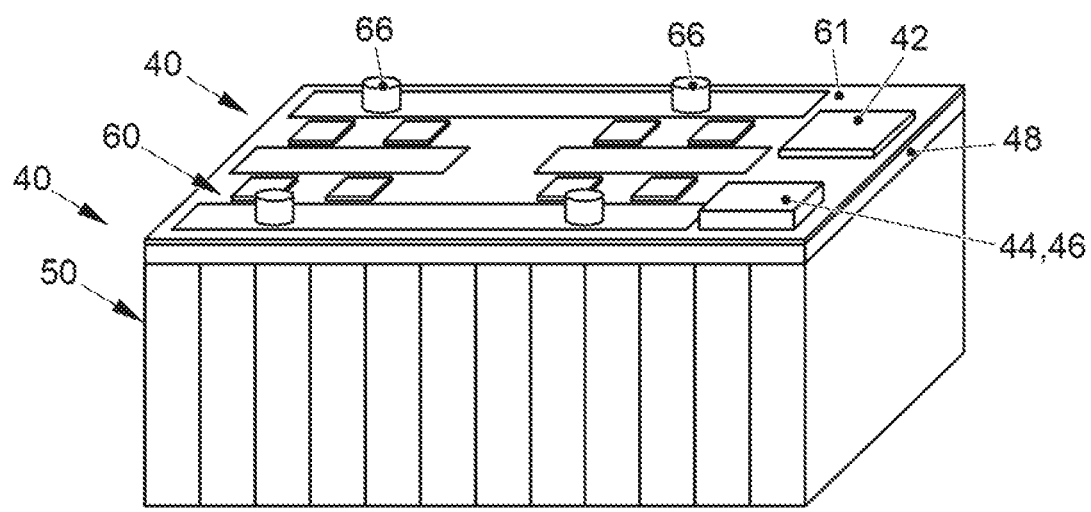
FIG. 4 shows the module from FIG. 3.

FIG. 4 shows the module 40 in the assembled state. The printed circuit board 61 is firmly connected to the energy storage unit 50, wherein an intermediate plate 48 is provided between the printed circuit board 61 and the energy storage unit 50 by way of example. The module has terminals 66 in order to allow a connection between adjacent modules 40.

Figure 5:
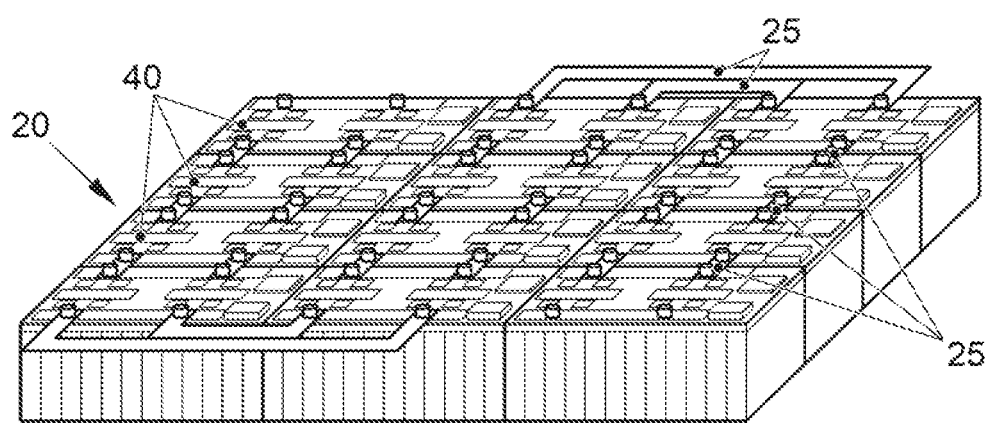
FIG. 5 shows the energy storage element having the modules from FIG. 3.

FIG. 5 shows an energy storage element 20 having twelve modules 40, which are interconnected in accordance with the circuit diagram from FIG. 1. The individual modules 40 are connected to adjacent modules via connecting lines 25.

Figure 6:
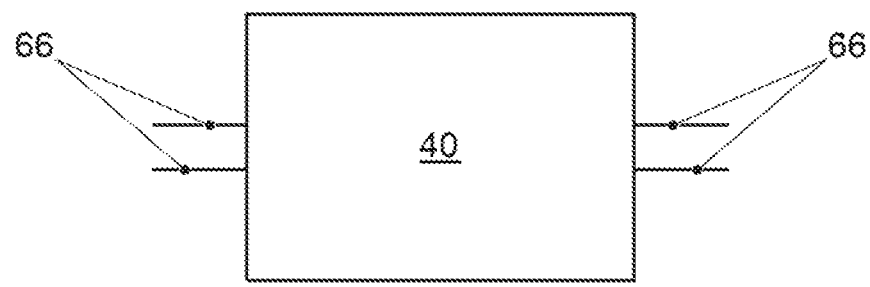
FIG. 6 shows a schematic depiction of an interconnection of the module.

FIG. 6 shows a schematic depiction of a module 40 having the associated terminals 66 via which the module 40 is connectable to an adjacent module 40 or to one of the poles 27, 28.

Figure 7:
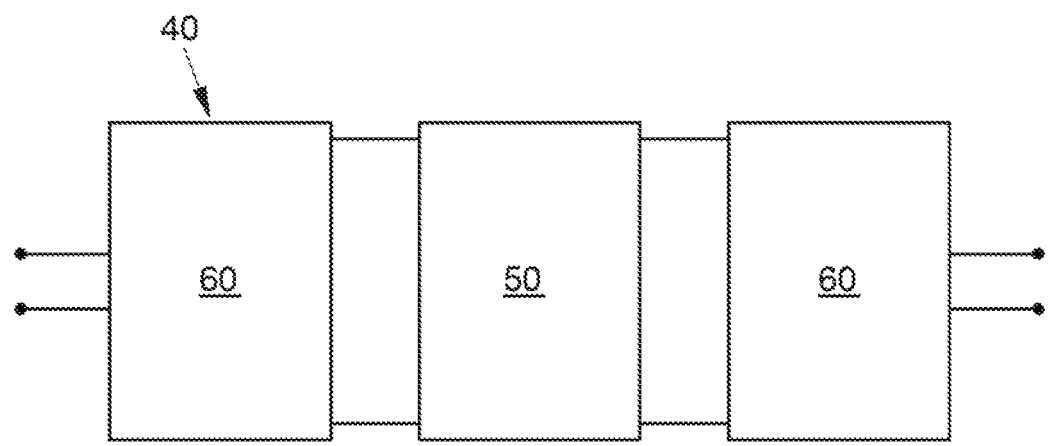
FIG. 7 shows a more detailed depiction of an embodiment of the module from FIG. 6.

FIG. 7 shows a schematic depiction of a first embodiment of the module 40 in which an interconnection unit 60 is provided on two sides of the energy storage unit 50. As a result, the module 40 can be connected to a further module 40 both to the left and to the right.

Figure 8:
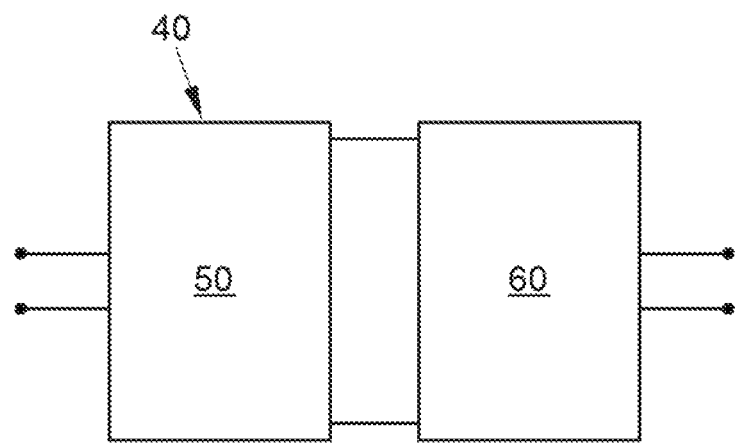
FIG. 8 shows a more detailed depiction of an embodiment of the module from FIG. 6.

FIG. 8 shows a second embodiment of the module 40 in which an interconnection unit 60 is provided on the energy storage unit 50 on one side only. As a result, the module 40 can be connected to a further module 40 on the right-hand side. On the left-hand side, it is possible to provide for a connection to one of the poles 27, 28, for example.

Figure 9:
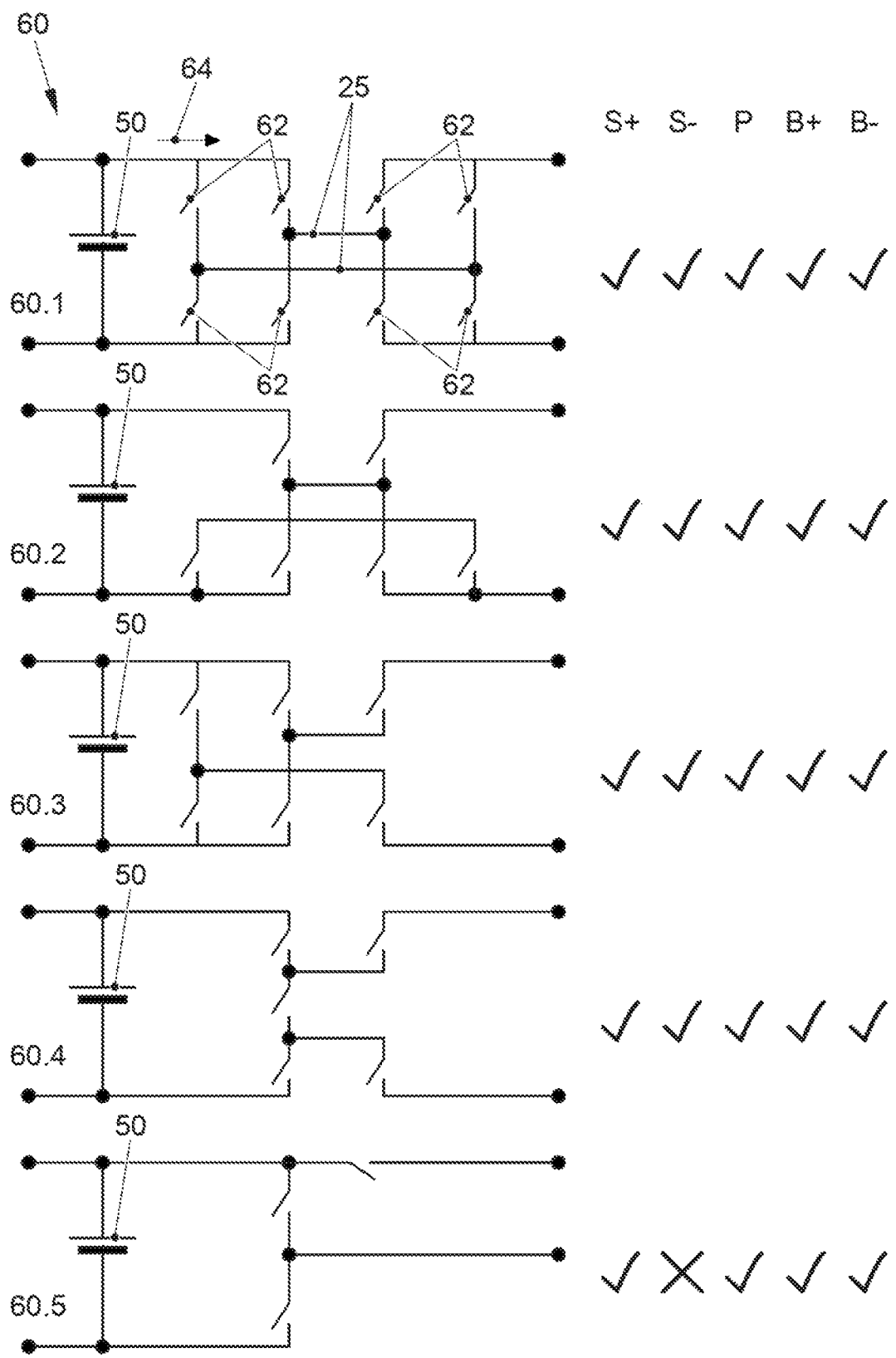
FIG. 9 shows possible interconnections between the modules.

FIG. 9 shows various embodiments of the interconnection unit 60. Microtopologies are also referred to. The embodiments are denoted by 60.1 to 60.5. The energy storage unit 50 is depicted schematically in each case, and to the right thereof multiple interconnection is shown that allows the useful current 64 to flow via one or more of the first switches 62. The connecting lines between the energy storage units 50 are provided with the reference sign 25.

On the right-hand side, the possible interconnections that can be obtained with the corresponding interconnection unit are listed. In this case, S+ denotes a series positive interconnection, S− denotes a series negative interconnection, P denotes a parallel interconnection, B+ denotes a bypass via the positive power rail and B− denotes a bypass via the negative power rail. The interconnection unit 60.5 does not allow a series negative interconnection. Not every embodiment requires every interconnection, and it is possible for one of the possible interconnections to be chosen that has as few first switches 62 as possible, for example.

Provision of the interconnection units 60 results in high degrees of freedom for reconfiguration within the energy storage element 20.

Further microtopologies are described in the following references, which are each incorporated by reference herein in their entirety:

WO 2017/016675 A1,
WO 2017/016674 A1,
DE 10 2011 108 920 A1,
DE 10 2010 052 934 A1,
S. Goetz, A. Peterchev, T. Weyh (2015), Modular multilevel converter with series and parallel module connectivity: topology and control. IEEE Transactions on Power Electronics, vol. 30, no. 1, pp. 203-215. doi: 10.1109/TPEL.2014.2310225,
M. Perez, S. Bernet, J. Rodriguez, S. Kouro, R. Lizana (2015), Circuit topologies, modelling, control schemes, and applications of modular multilevel converters. IEEE Transactions on Power Electronics, vol. 30, no. 1, pp. 4-17. doi: 10.1109/TPEL.2014.2310127.

Figure 10:
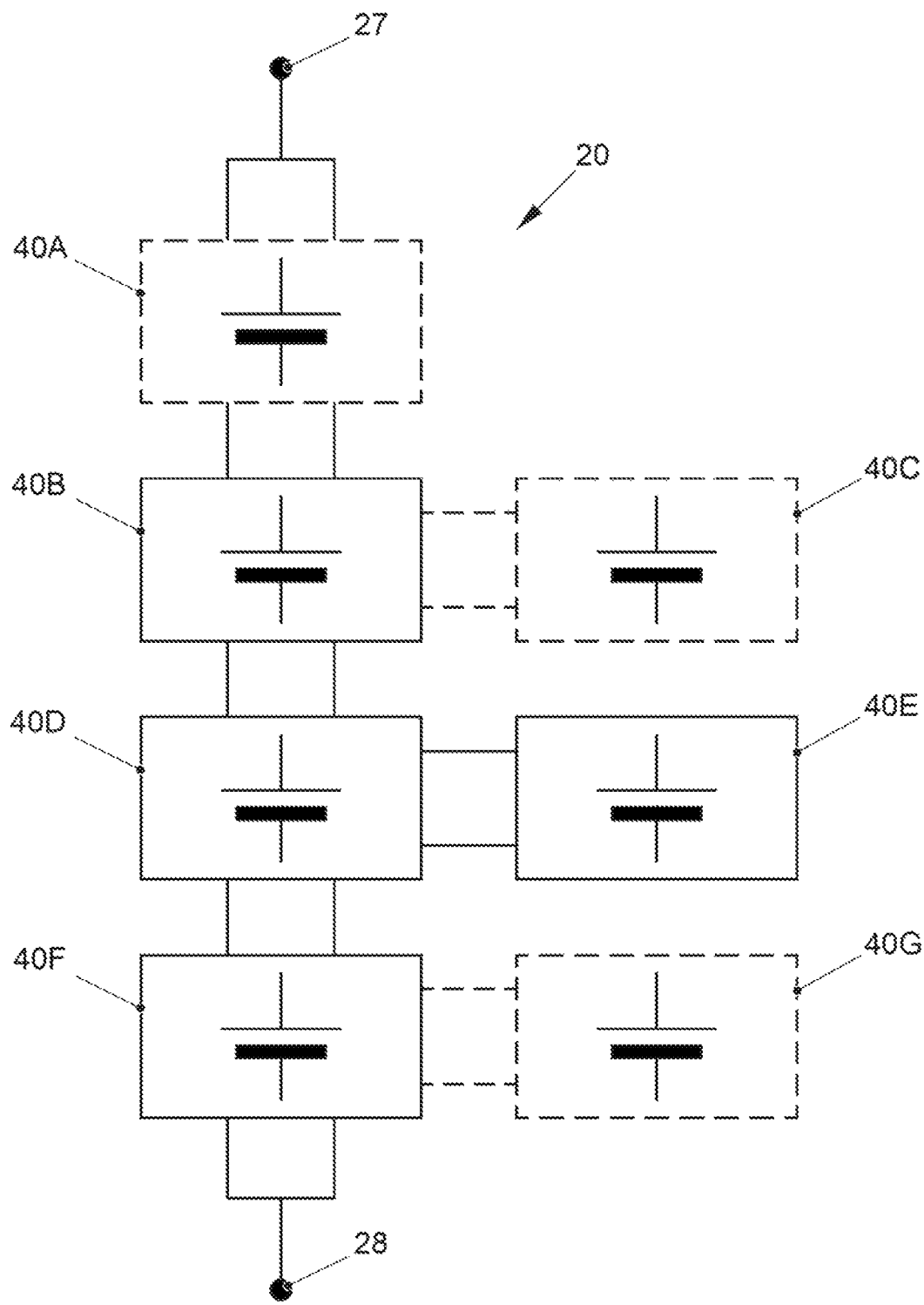
FIG. 10 shows a schematic depiction of an interconnection of the modules.

FIG. 10 shows a possible interconnection of seven of the modules 40 between the poles 27, 28, as is computed by the first control apparatus 22 and output to the modules 40. The number of modules 40 interconnected in series determines the voltage between the poles 27, 28. In the configuration shown, the module 40A is bypassed and thus does not contribute to the total voltage. This may be necessary, for example, if the module 40A is not working correctly, or if a lower total voltage A is desired at the poles 27, 28. The modules 40B, 40D and 40F are connected in series, and the module 40D has a module 40E connected in parallel with it. This may be advantageous, by way of example, if the module 40D is discharged to a greater extent than the other modules, and the addition of the module 40E decreases the discharge of the module 40D. Also, a charge equalization can be effected between the modules 40D and 40E, and the total resistance is decreased by the parallel connection. The module 40B can have a module 40C connected in parallel with it. The parallel connection is deactivated (dashed line), however. This may be advantageous if the module 40C is discharged to a greater extent than other modules 40 or if, during a charging process for the energy storage element 20, the module 40B is discharged to a greater extent than the other modules 40. In the same way, there is the option of a parallel connection of the module 40G to the module 40F, wherein the module 40G is also deactivated. In the exemplary embodiment, the first control apparatus 22 has actuated the modules 40 such that there is provision for a series interconnection of modules 40, the series-connected modules 40 each being able to have one or more further modules 40 connected in parallel with them, or else not. This type of interconnection is advantageous over a parallel interconnection of already series-connected modules, since higher voltages arise in the case of a parallel interconnection of this kind and, as a result, there are also greater demands on the first switches 62. The embodiment shown, in which modules 40 that are not already interconnected in series are additionally interconnected in parallel, allows the use of low-voltage semiconductor switches. A person skilled in the art refers to the low-voltage range for such semiconductor switches in vehicles if a DC voltage is lower than 60 V or the rms value of an AC voltage is lower than 30 V. The voltage on the energy storage unit 50 to be interconnected by the first switch 61 determines what the dielectric strength of the first switch 61 needs to be designed to be.

Figure 11:
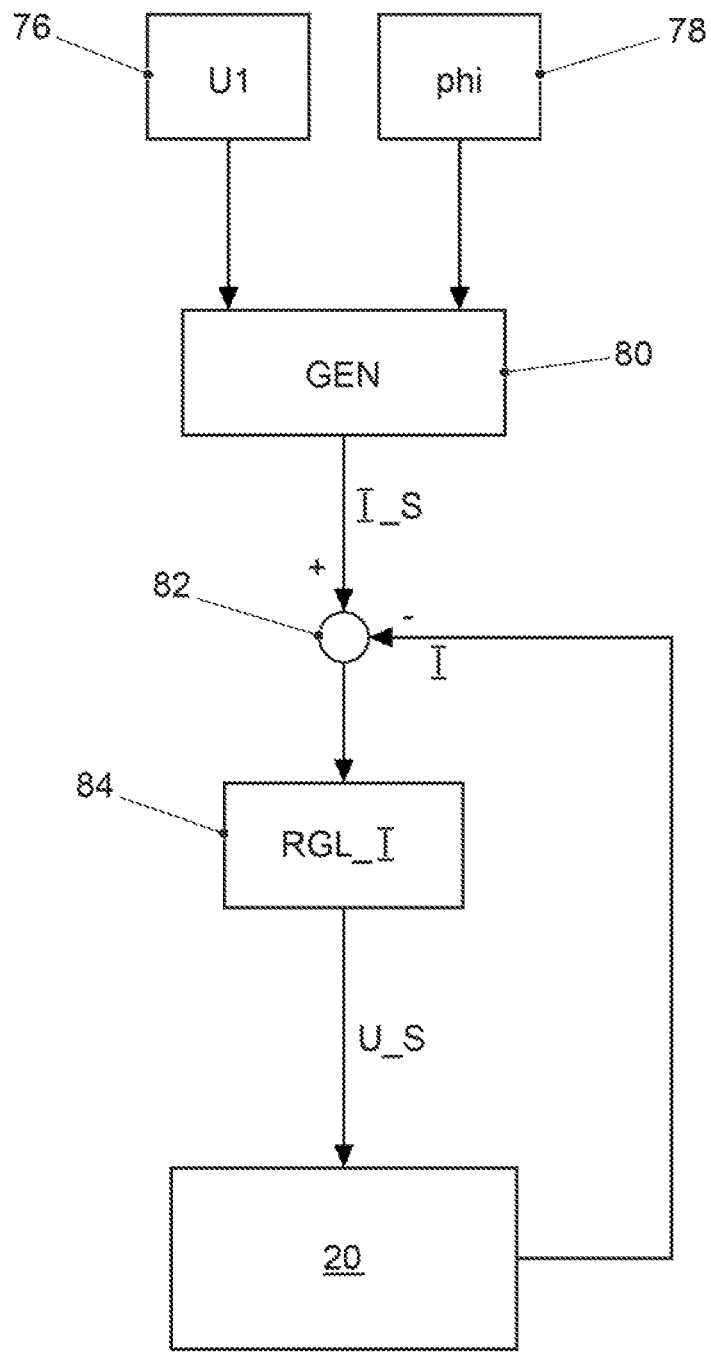
FIG. 11 shows a schematic depiction of a design of a current controller for the charging current.

FIG. 11 shows the schematic sequence for a charging apparatus of the energy storage element 20. A measuring apparatus 76 for the charging voltage ascertains a voltage value U1 of the rectified charging voltage, and said voltage value is supplied to a signal generator GEN 80. Optionally, an encoder 78 is provided that prescribes a phase angle phi for the signal generator 80. The signal generator 80 takes these values and possibly additionally the desired power as a basis for generating a signal I_S indicating the setpoint value for the charging current. The signal I_S is supplied to a comparator 82, and the comparator 82 computes the control difference between the setpoint value I_S and a current actual value I. The control error is supplied to a current controller 84, referred to as RGL_I. The current controller 84 may be a P controller or PID controller or another controller, for example, P standing for proportional, I standing for integral and D standing for differential. The current controller 84 preferably outputs a setpoint voltage U_S as the value of a manipulated variable, said setpoint voltage being supplied to the energy storage element 20 and bringing about reconfiguration of the modules 40 there if need be. The energy storage element 20 is therefore continually reconfigured in order to produce a current that follows the voltage value U1 and hence to generate a good power factor. A decrease in the voltage setpoint value U_S results in more current flowing into the energy storage element 20, and an increase results in accordingly less. On the basis of the setpoint voltage U_S, the charging current I increases or reduces, and said charging current is measured in the energy storage element 20, for example, and supplied to the comparator 82.

The result obtained is a charging current I whose waveform corresponds to the waveform of the charging voltage, possibly with a selectable phase shift phi. This results in a good power factor.

The voltage value U1 of the rectified charging voltage can alternatively be computed from the input voltages on the AC side of the charging unit 70.

Provision of the signal generator 80 may be unnecessary if a largely constant DC current is involved. A largely constant DC current of this kind is also obtained when a three-phase AC signal is rectified, and it may also be possible to dispense with a signal generator 80 in this case.

Figure 12:
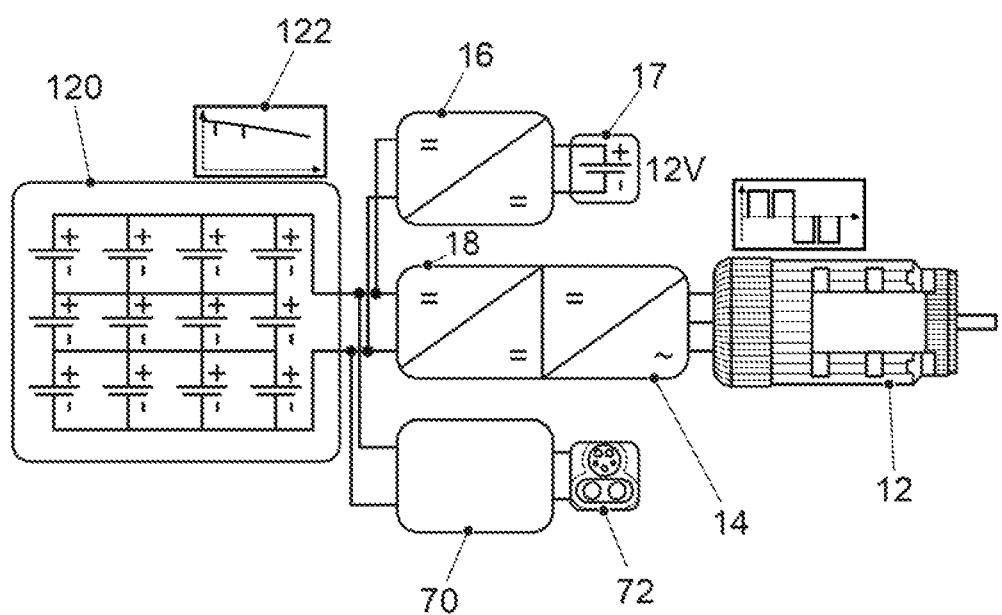
FIG. 12 to FIG. 29 show exemplary embodiments of the use of the arrangement from FIG. 1.

FIG. 12 shows the drive train of an electric vehicle having an energy storage element 120 according to the prior art, in which the battery cells are hardwired. The energy storage element 120 has a first DC/DC converter 16 provided on it that feeds a battery 17 for the vehicle electrical system, for example. Moreover, the energy storage element 120 has a second DC/DC converter 18 provided on it whose output is connected to a drive inverter 14. The output of the drive inverter 14 is connected to an AC motor 12. The second DC/DC converter 18 is used to convert the voltage of the energy storage element 120 to a prescribed voltage, and the drive inverter 14 produces an AC voltage suitable for the AC motor from the DC voltage. A charging terminal 72 and a charging unit 70 connected thereto are connected to the energy storage element 120 in order to allow the energy storage element to be charged.

The graph 122 shows the voltage on the energy storage element 120, plotted over time. It can be seen that the voltage falls over time on account of the discharge of the energy storage element 120, and a very large load results in voltage dips, which appear as spikes.

Figure 13:
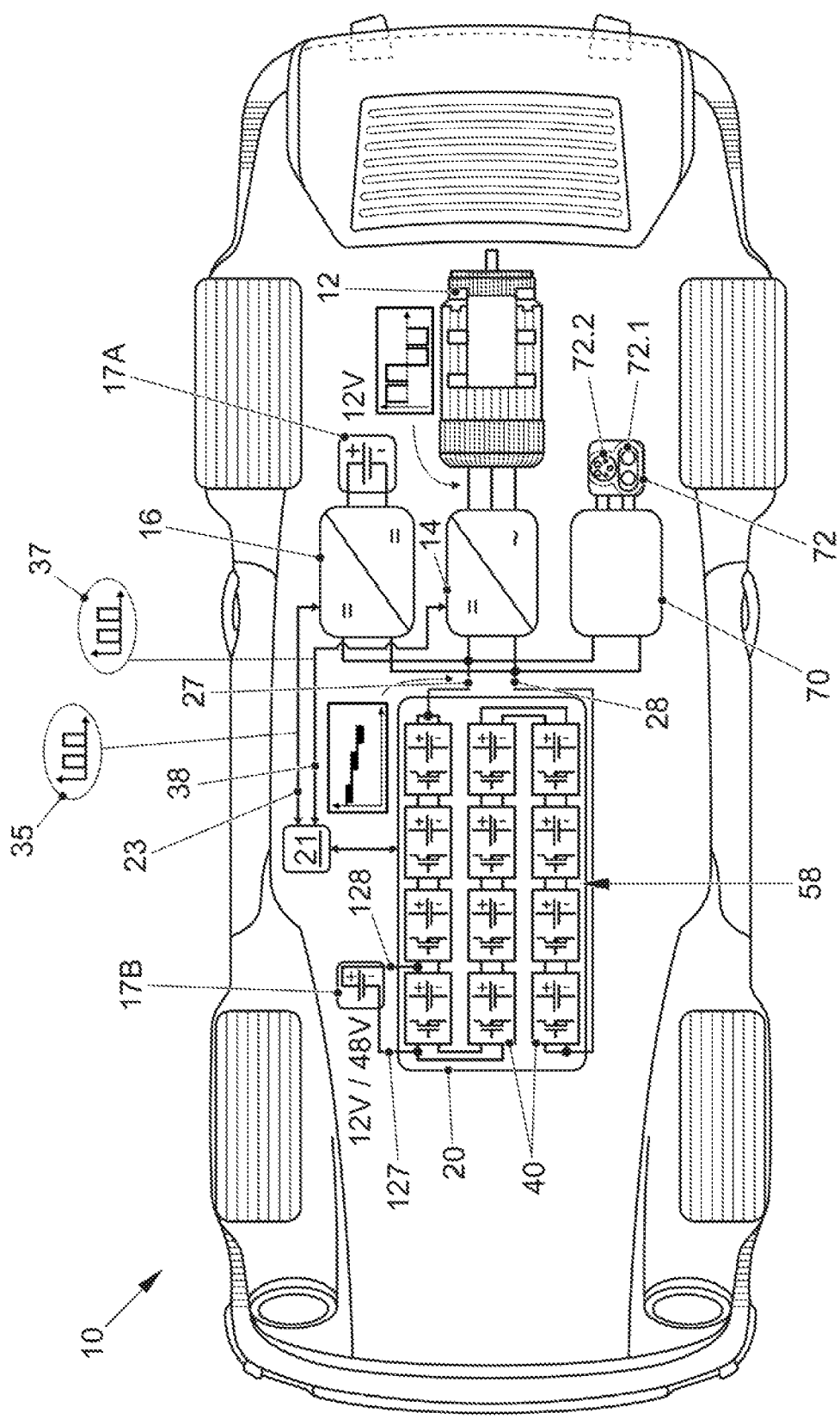

FIG. 13 shows an arrangement according to FIG. 12, but with an energy storage element 20 that is reconfigurable and can provide different voltages at the poles 27, 28. As a result, it is possible to dispense with the second DC/DC converter 18 from FIG. 12. The energy storage element 20 has additional second poles 127, 128 besides the poles 27, 28. The poles 127, 128 are connected to at least one of the modules 40, and the maximum voltage at the poles 127, 128 is lower than the maximum voltage at the poles 27, 28. The DC/DC converter 16 has a battery 17A provided on it and the second poles 127, 128 have a battery 17B provided on them. On the basis of the basic voltage of one of the modules 40 and the desired voltage on the battery 17B, it is possible to decide whether one module 40 suffices or whether two or more modules 40 are required. It is possible to connect the poles 127, 128 to an energy storage unit 50 of a module 40 directly, and this firmly results in the voltage of this energy storage unit 50. However, it is also possible to connect the poles 127, 128 to the modules 40 via one or more of the interconnection units 60. This can influence from which module 40 the feed is provided, and intermediate voltages are also possible by virtue of one of the modules 40 being connected alternately in series or parallel and bypassed in a second state, for example. This produces an average voltage that is below the voltage of the applicable module 40 or the applicable modules 40.

The vehicle 10 has the second control apparatus 21, and the drive inverter 14 is connected to the second control apparatus 21 via the first data line 23 and designed to transmit a first data signal 35 to the second control apparatus 21. The second control apparatus 21 is designed to take the first data signal 35 as a basis for transmitting a voltage setpoint value U_S to the first control apparatus 22, cf. FIG. 1.

Preferably, the second DC/DC converter 16 is provided having inputs and outputs, which inputs are connected to the two first poles 27, 28 directly or indirectly. Preferably the second DC/DC converter 16 is connected to the second controller apparatus 21 by a second data line 38 and designed to transmit a second data signal 37 to the second control apparatus 21. The second control apparatus 21 is designed to take the first data signal 35 and the second data signal 37 as a basis for prescribing a voltage setpoint value U_S with the first control apparatus 22. Loads such as the DC/DC converter 16 and the drive inverter 14 have different optimum operating points and large suitable ranges for the input voltage in principle or on the basis of the present power. This can e.g. be utilized in that, if one of the loads becomes very hot owing to a high power loss, the voltage of the energy storage element 20 is set to a value that is preferred for this load. As a result, the load can operate at a good operating point and produces less power loss. The temperature can fall.

Figure 14:
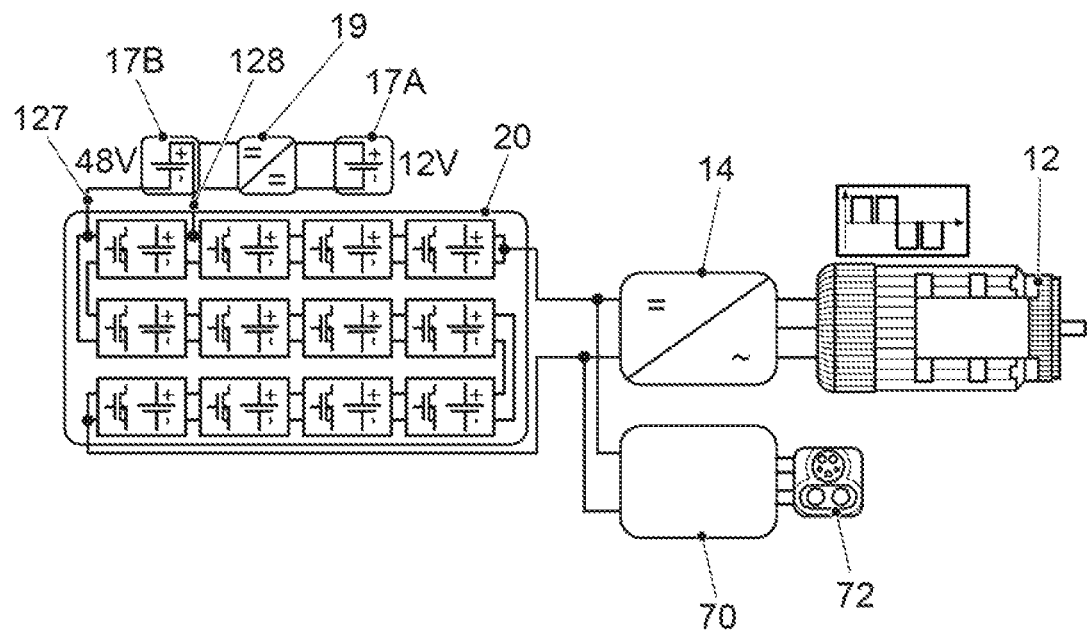

FIG. 14 shows a further embodiment of the arrangement. The energy storage element 20 has two poles 127, 128 via which a battery 17B can be fed, as in FIG. 13. The battery 17B has a voltage of 48 V, for example. The battery 17B is connected to a battery 17A operating at a voltage of 12 V, for example, via a DC/DC converter 19. As a result, multiple voltages can be produced for different loads via the poles 127, 128.

The DC/DC converter 19 preferably has an isolating apparatus designed to bring about DC isolation between the two second poles 127, 128 and between the inputs of the DC/DC converter 19 and the outputs of the DC/DC converter 19. The isolating apparatus preferably has a transformer or a capacitor.

Figure 15:
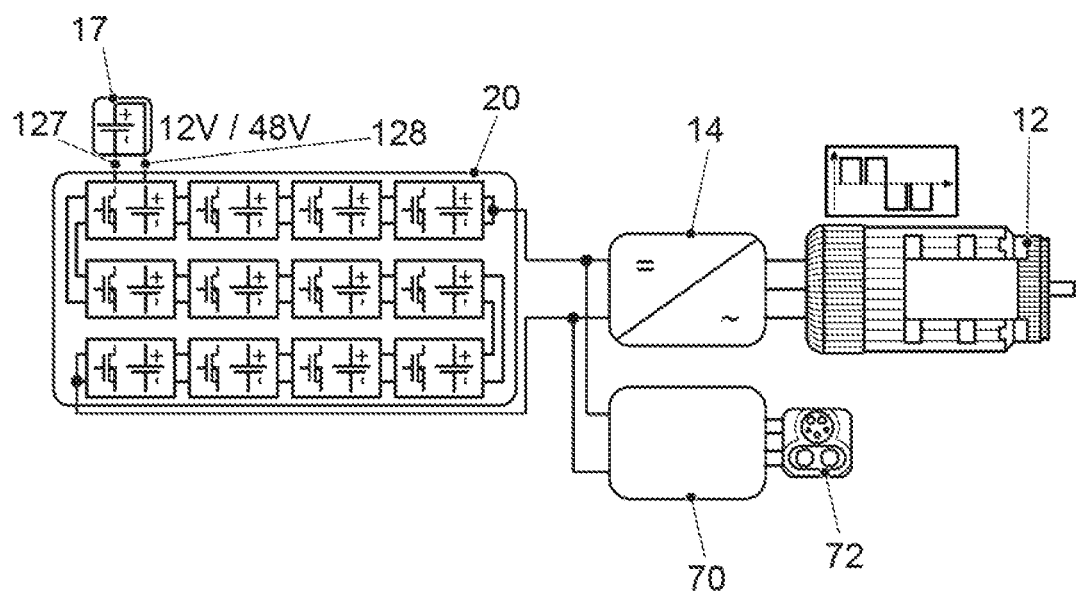

FIG. 15 shows an arrangement according to FIG. 13, wherein the poles 127, 128 in the energy storage element 20 are connected to an energy storage unit 50 directly and therefore make the voltage available to the applicable energy storage unit 50 directly. There may also be multiple energy storage units 50 connected in parallel and/or series.

Figure 16:
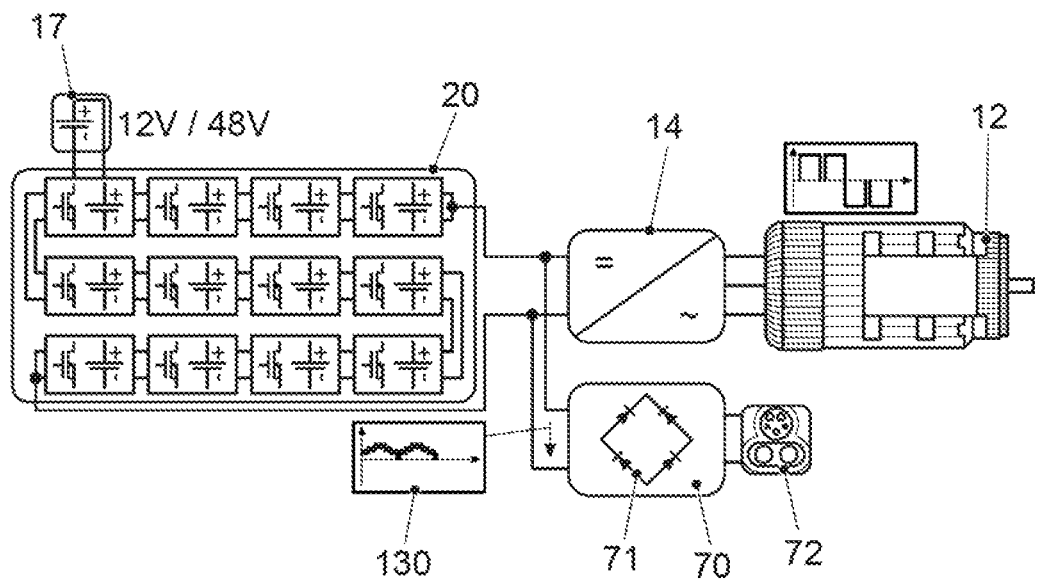

FIG. 16 shows an arrangement according to FIG. 15, wherein the charging unit 70 has an AC/DC converter or rectifier 71. In the present case, a passive AC/DC converter 71 is shown, but the AC/DC converter 71 may also be active. The graph 130 shows the output voltage on the AC/DC converter 71 of the charging unit 70, said graph additionally being influenced by the energy storage element 20. When an AC voltage is supplied at the charging terminal 72, the output voltage according to graph 130 has a rippled shape. It is firstly possible to use a current controller according to FIG. 11, but without a signal generator 80. With a largely constant voltage at the output of the charging unit 70, this is easily possible. With a rippled voltage, as shown in graph 130, however, a constant charging current results in a very poor power factor. It is thus advantageous to use the full functionality according to FIG. 11, where the signal generator controls the charging current on the basis of the voltage on the charging unit 70. This greatly improves the power factor. The embodiment shown is for a single-phase AC voltage, as provided for basic loads in the domestic electrical system, for example.

Figure 17:
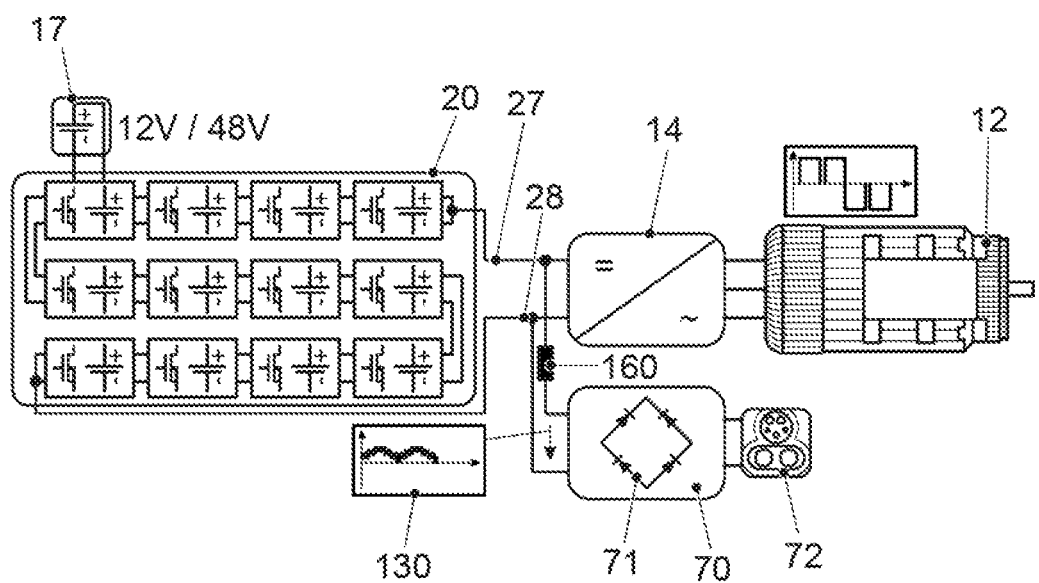

FIG. 17 shows an arrangement according to FIG. 16, wherein an inductance 160 is provided at an output of the charging unit 70 in the connection between this output and one of the poles 27 or 28. The inductance 160 brings about a phase shift and therefore also influences the power factor. Since more capacitive loads than inductive loads usually occur in the domestic electrical system, providing for the inductance 160 is positive.

Figure 18:
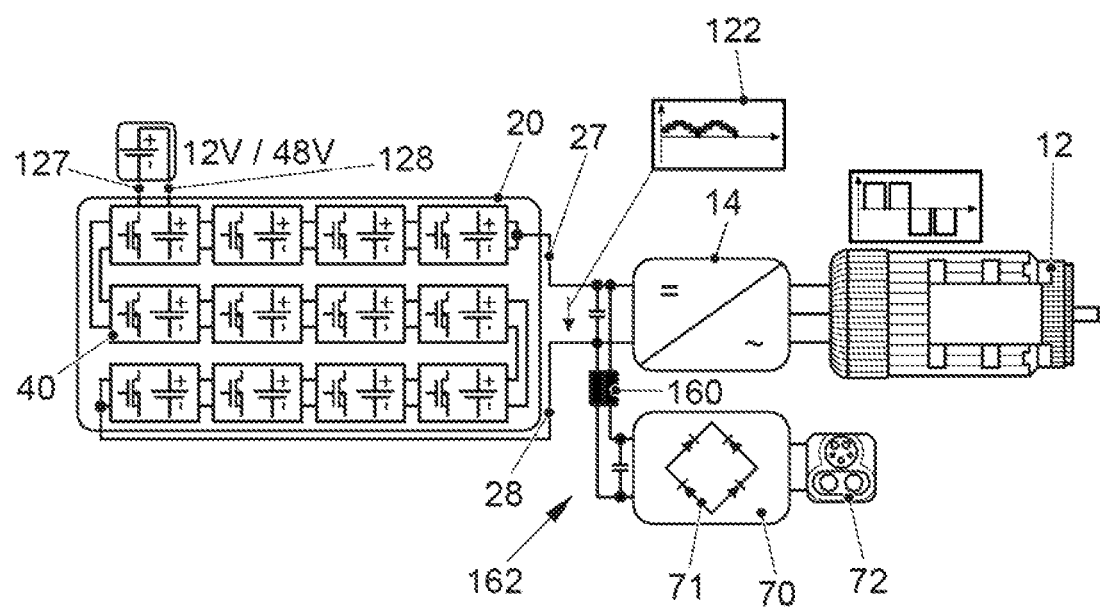

FIG. 18 shows an arrangement according to FIG. 17, wherein a filter 162 is provided between the output of the charging unit 70 and the poles 27, 28. The graph 122 shows the voltage at the poles 27, 28 of the energy storage element 20, and the reconfiguration of the modules 40 means that the voltage has steps. The filter 162 has, by way of example, an inductance between the respective outputs of the charging unit 70 and the associated poles 27, 28, and a respective capacitance in the form of a capacitor is provided between the outputs of the charging unit 70 and also between the poles 27, 28. The filter smooths the steps in the voltage on the energy storage element 20, and this relieves the load on the electrical supply system. Also, measurement of the voltage on the charging unit 70 is facilitated when an apparatus as shown in FIG. 11 is used, since said charging unit is influenced less by the energy storage element 20 than without the filter 162.

Figure 19:
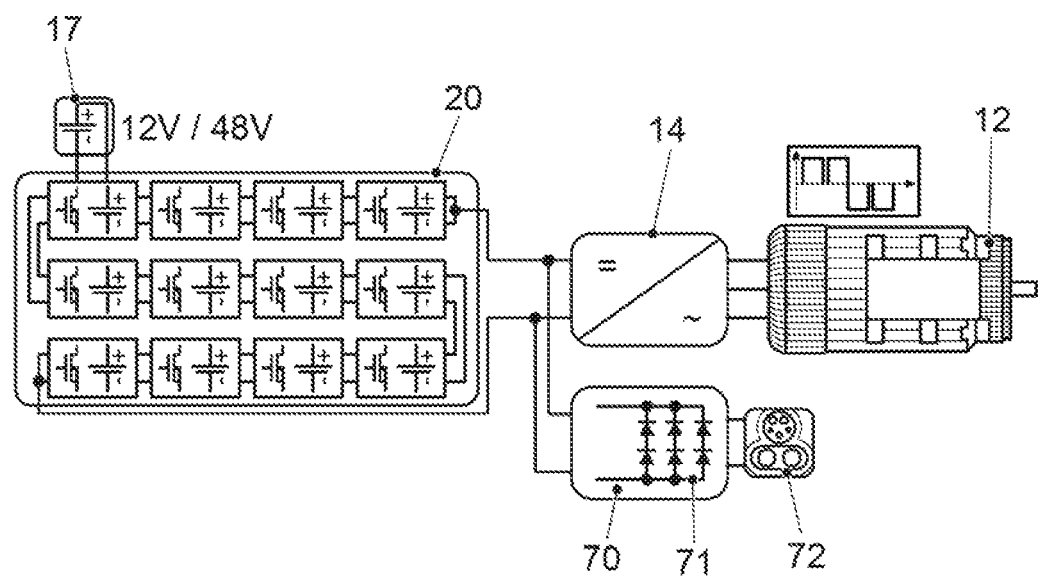

FIG. 19 shows an arrangement according to FIG. 16. However, the charging unit 70 has a three-phase rectifier or AC/DC converter 71. As a result, the charging terminal 72 may also have a three-phase AC current connected to it, which is also referred to as three-phase current.

Figure 20:
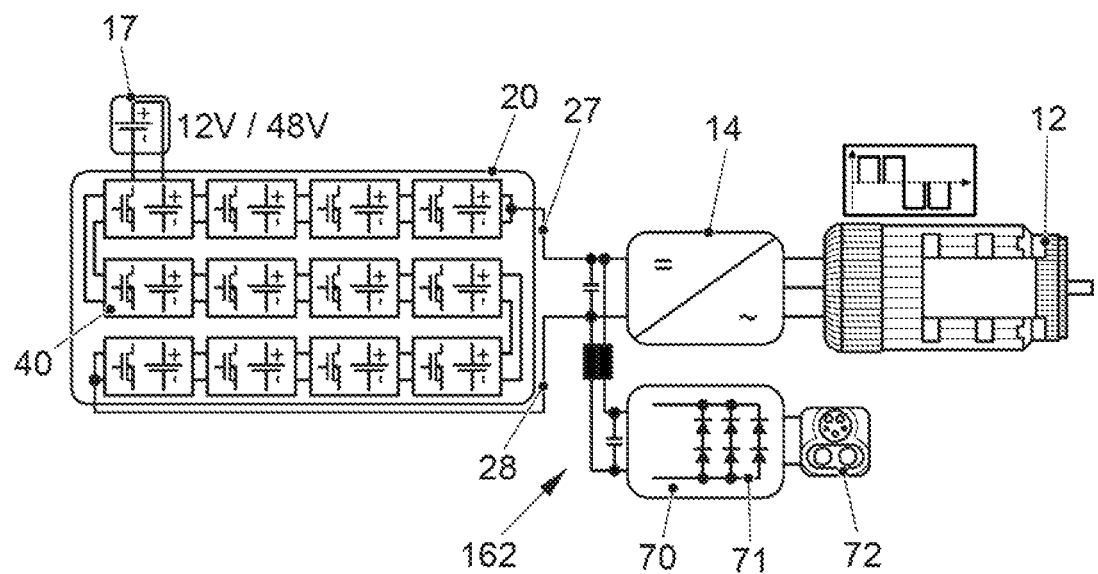

FIG. 20 shows an arrangement according to FIG. 19, wherein, as in FIG. 18, a filter 162 is provided between the charging unit 70 and the poles 27, 28. Instead of the filter 162, it is also possible to provide for an inductance 160 according to FIG. 17 as a filter.

Figure 21:
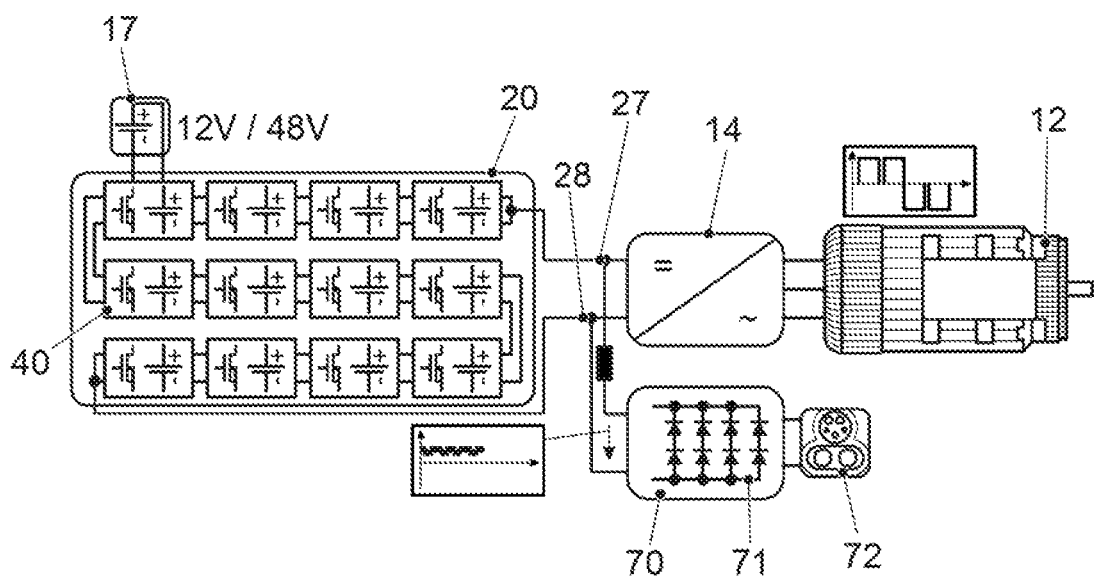

FIG. 21 shows an arrangement according to FIG. 20, wherein the charging unit 70 has a four-phase rectifier. This allows rectification of an AC signal with three phases L1, L2, L3 and a neutral conductor N. In this case too, a connection between the charging unit 70 and the poles 27, 28 is possible with or without a filter 162.

Figure 22:
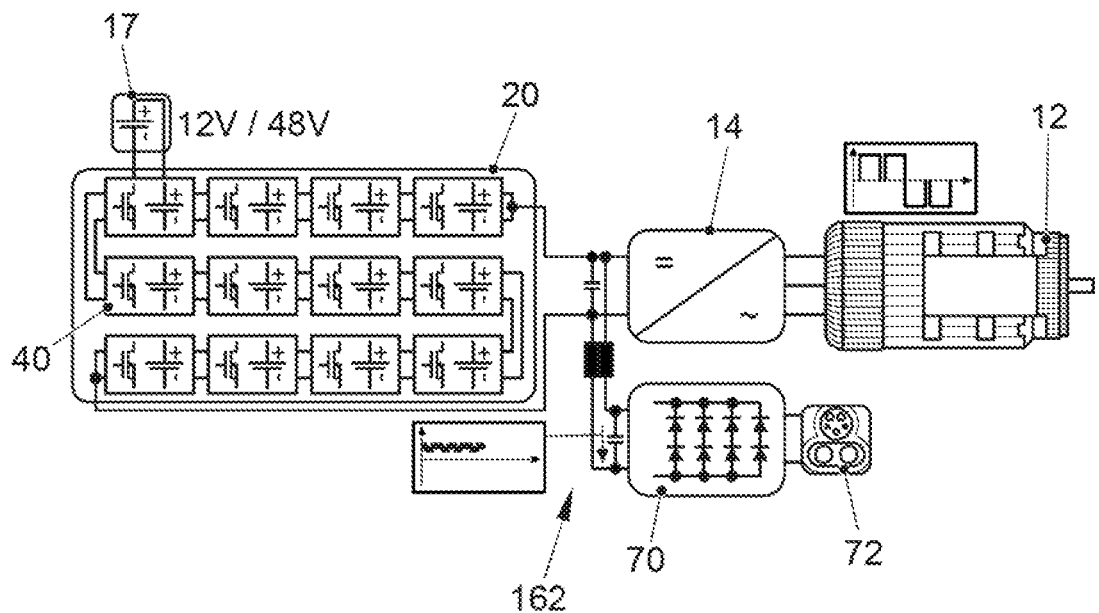

FIG. 22 shows a corresponding arrangement having a filter 162.

Figure 23:
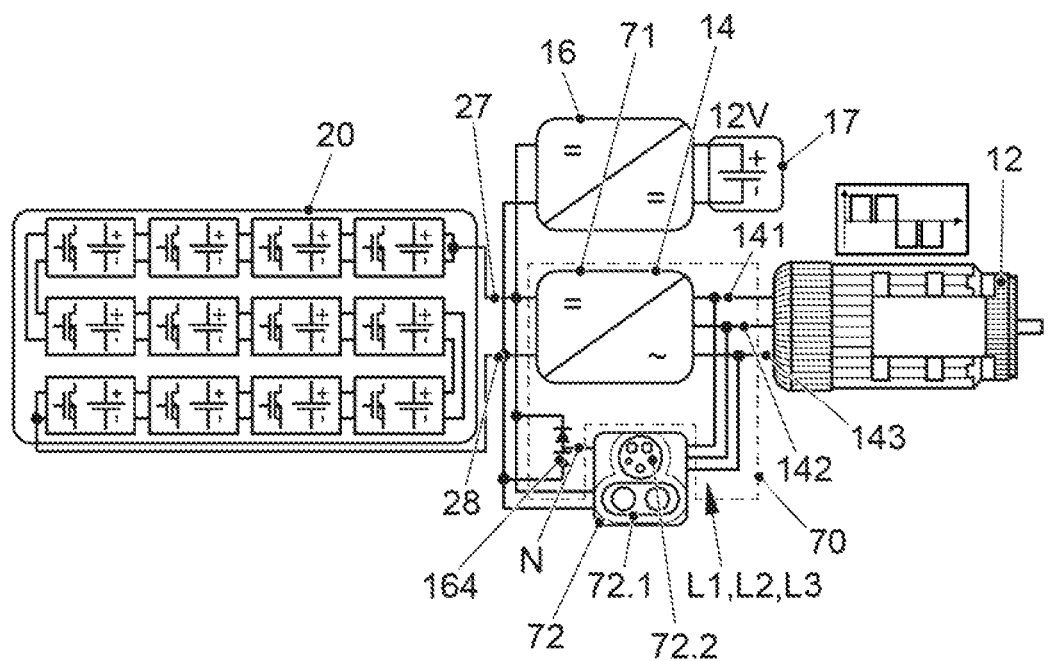

FIG. 23 shows an arrangement according to FIG. 13. The charging terminal 72 allows connection of both a DC voltage and an AC voltage. The DC voltage is supplied to the poles 27, 28 as in FIG. 13, either with or without a filter. For charging with an AC current, for example a three-phase AC current, the charging unit 70 uses the drive inverter 14. In normal mode, the drive inverter 14 is responsible for providing a polyphase voltage suitable for the AC motor 12 from a DC voltage of the poles 27, 28. To this end, the drive inverter 14 has a plurality of phase terminals 141, 142, 143. Such drive inverters 14 can also be used as an AC/DC converter 71 in the opposite direction to convert a polyphase voltage into a DC voltage. To this end, the phase terminals L1, L2 and L3 of the charging terminal 72 are connected to the phase terminals 141, 142, 143 of the drive inverter 14. The neutral conductor N is connected to the poles 27, 28 via a neutral conductor circuit 164. By way of example, the neutral conductor circuit 164 has a first diode connected from the neutral conductor terminal N to the pole 27, with the cathode pointing to the pole 27. The neutral conductor terminal N and the pole 28 likewise have a diode provided between them, with the cathode pointing to the neutral conductor terminal N.

The charging terminal 72 has a first charging terminal unit 72.1 for a DC voltage and a second charging terminal unit 72.2 for an AC voltage. The first charging terminal unit 72.1 is at least partially interconnected with the DC side of the drive inverter 14, and the second charging terminal unit 72.2 is at least partially interconnected with the AC side of the drive inverter 14. In the case of the second charging terminal unit 72.2, however, the neutral conductor may be interconnected with the DC side of the drive inverter 14.

Figure 24:
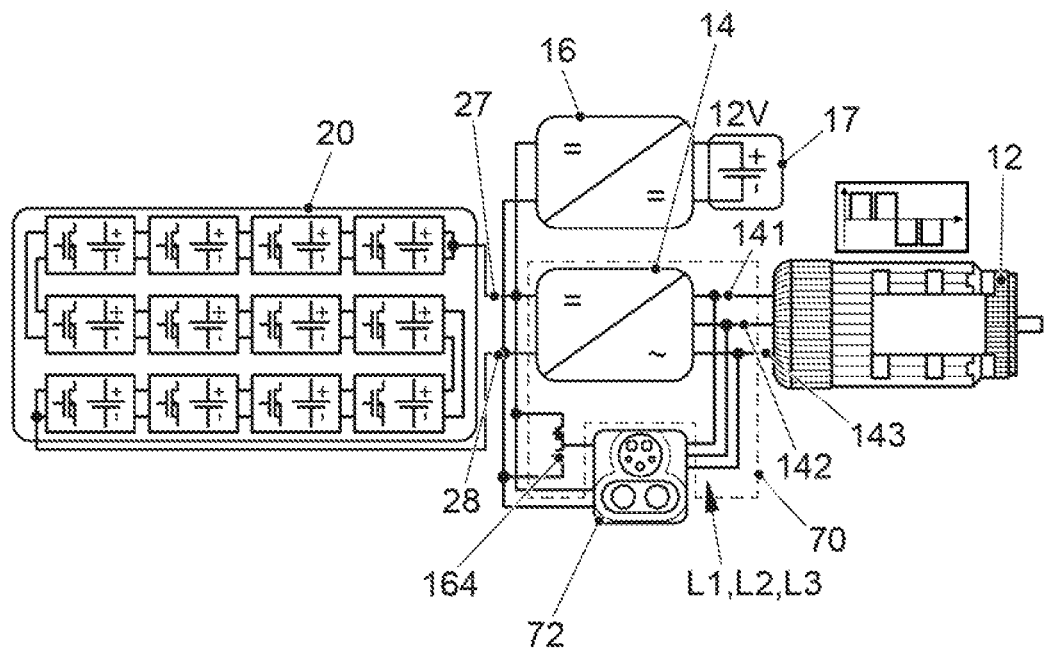

FIG. 24 shows an arrangement according to FIG. 23, wherein the neutral conductor circuit 164 providing a connection between the neutral conductor terminal 72 and the poles 27, 28 is of active design with two switches. The switches of the neutral conductor circuit 164 can be connected such that they act like the diodes from FIG. 23.

Figure 25:
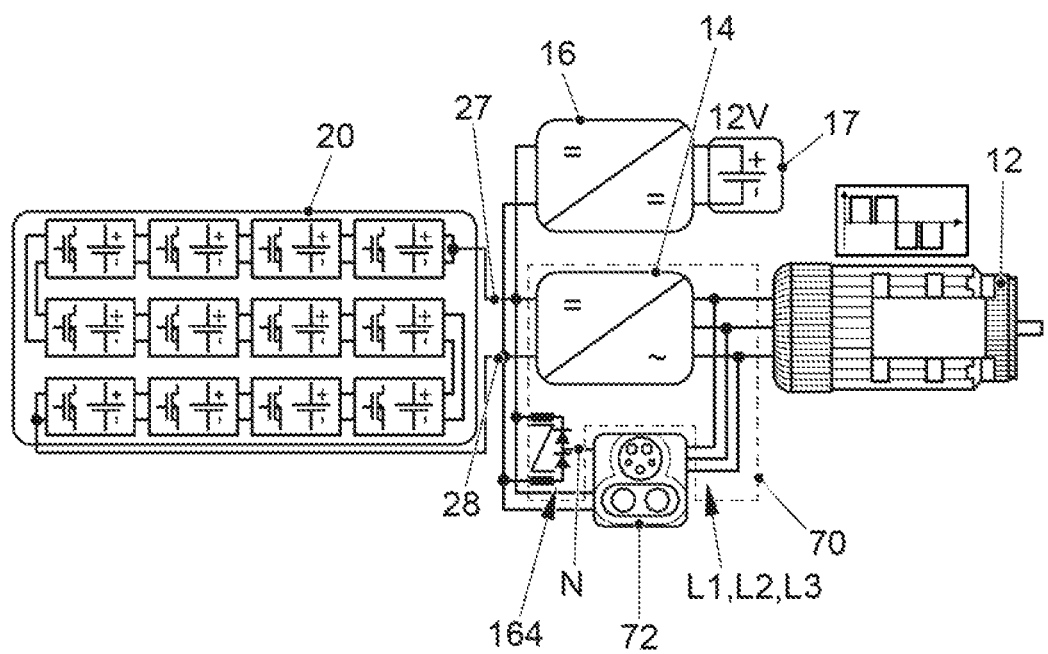

FIG. 25 shows an arrangement according to FIG. 23. Unlike in FIG. 23, the diodes of the neutral conductor circuit 164 and the respective associated poles 27, 28 have additional inductances provided between them. The inductances are preferably coupled, and they bring about a phase shift between the voltage on the neutral conductor N and at the respective pole 27, 28.

Figure 26:
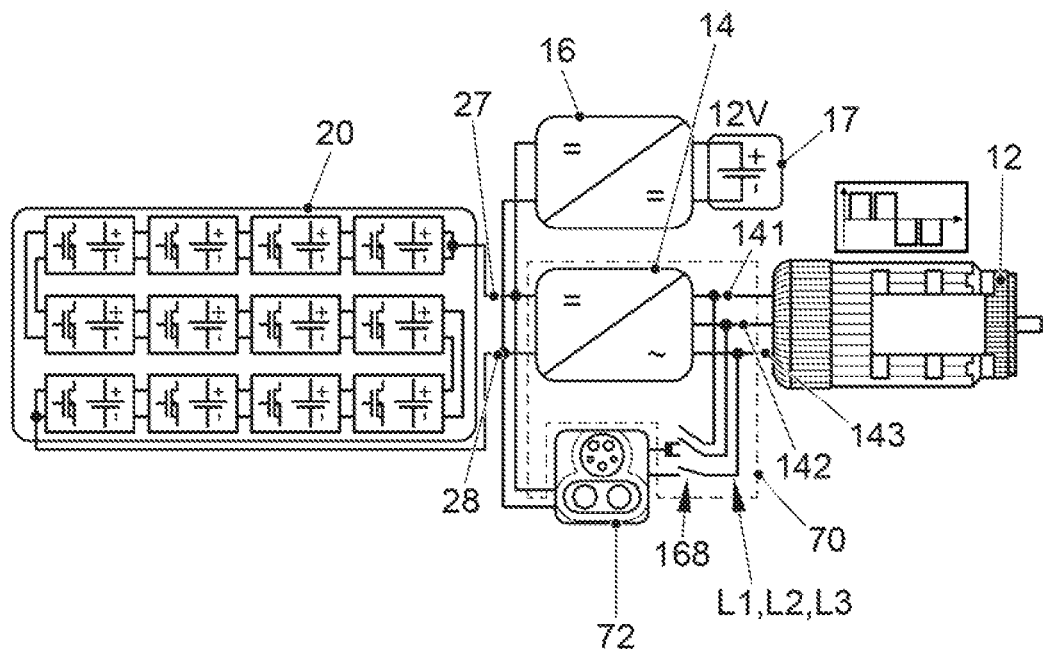

FIG. 26 shows an arrangement according to FIG. 23, but for a single-phase AC terminal, as used in households, for example. The DC side of the charging terminal 72 is connected to the poles 27, 28 directly. On the AC side, the drive inverter 14 is used in the opposite direction for AC/DC conversion. To this end, three lines L1, L2, L3 are provided that are connected firstly to the phase terminals 141, 142, 143 of the drive inverter 14 and secondly via switches 168 to the charging terminal 72. In the case of service connections, it is usually not explicitly prescribed which terminal has the neutral conductor and which terminal has the phase. Thus, the charging unit 70 can establish by measurement which terminal has the phase, and the switches can subsequently be used to set how the interconnection is made between the charging terminal 72 and the phase terminals 141, 142, 143.

Figure 27:
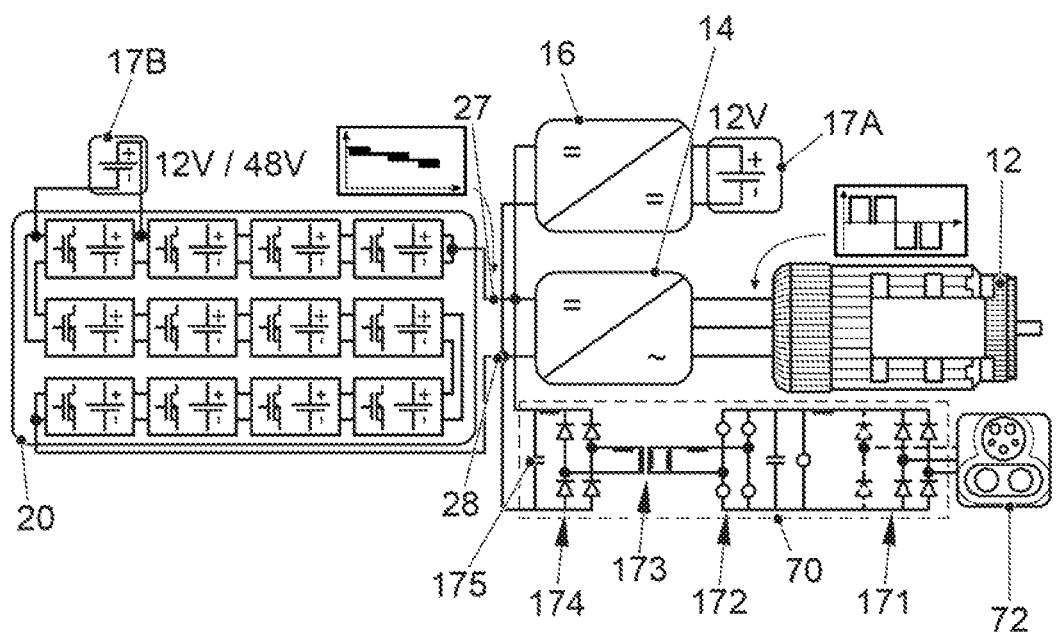

FIG. 27 shows an arrangement according to FIG. 15. The charging unit 70 has a rectifier 171, an inverter 172, a transformer 173, a rectifier 174 and a capacitor 175. The charging unit 70 shown allows both a DC current and an AC current to be supplied. In the case of an AC current, rectification is effected by the rectifier 171. The DC current is subsequently converted by the inverter 172 such that an AC current is obtained on the primary side of the transformer 173. Said AC current is transmitted by the transformer 173 to the secondary side, and at this time the voltage can be adjusted to a desired value. The signal on the secondary side of the transformer 173 is subsequently rectified by means of the rectifier 174 and smoothed by means of the capacitor 175.

The AC voltage on the domestic electrical system is usually at a comparatively low frequency of 50 Hz or 60 Hz, and the transformer 173 would be very large at such a frequency. Using the inverter 172, on the other hand, it is possible to provide an AC voltage at a much higher frequency, and this allows the transformer 173 to be of smaller design, for example approximately the size of a fist.

Figure 28:
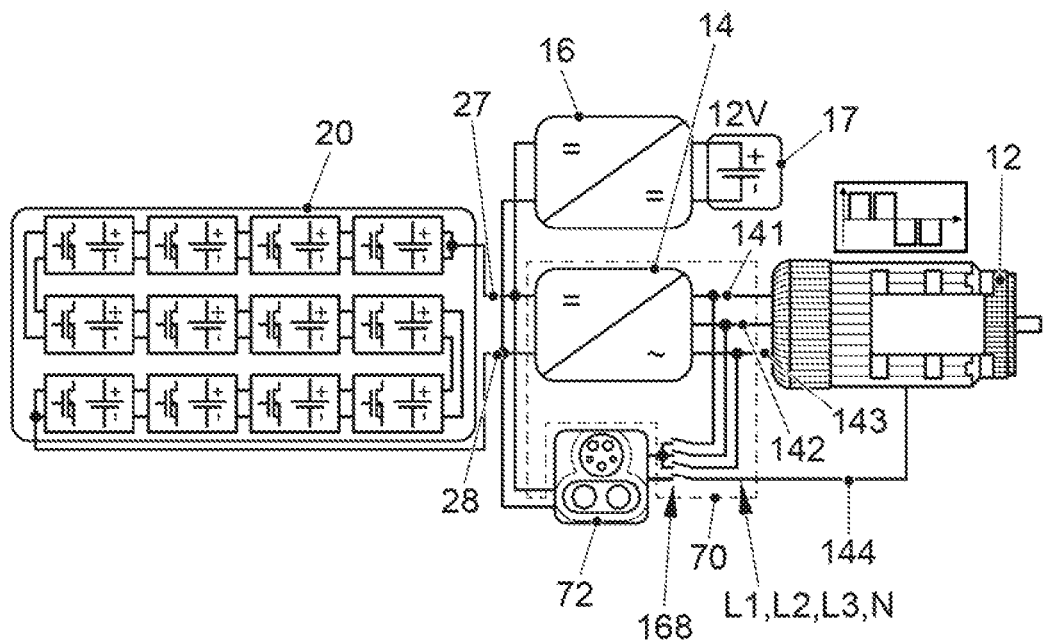

FIG. 28 shows an arrangement according to FIG. 26. Unlike in FIG. 26, the AC side of the charging unit 70 has four connections L1, L2, L3 and N, wherein the connections L1, L2 and L3 are connected to the phase terminals 141, 142 and 143 of the drive inverter 14, and the terminal N is connected to the AC motor 12. In the case of an AC motor 12 having a star circuit, the terminal N can be connected to the star point of the star circuit directly.

The switches 168 are used to be able to react to charging plugs with a different assignment of the pins, since, by way of example, as discussed above, the association between the phases and the terminals is not explicit in the case of service connections.

Figure 29:
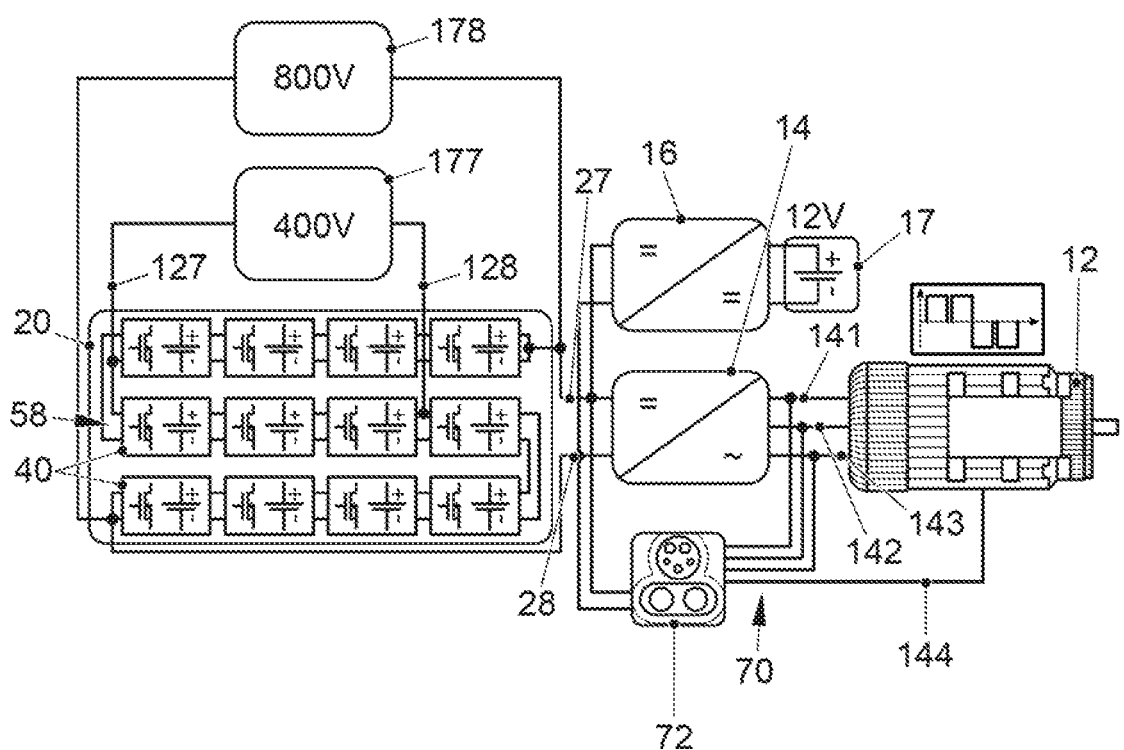

FIG. 29 shows an arrangement according to FIG. 28, wherein there is no provision for switches 168 of the charging unit 70. This is possible if there is a fixed association between the phases and the charging terminal 72. A high-voltage vehicle electrical system operating at 800 V, for example, is additionally depicted at the poles 27, 28. The high-voltage vehicle electrical system 178 can be used to supply a heater for the interior or a heater for the battery, for example, with electric power. The energy storage element 20 additionally has second poles 127, 128, at which a further high voltage vehicle electrical system 177 is provided. As a result, further components in the vehicle can be provided with a further voltage, for example with a voltage of 400 V. Preferably, the high voltage vehicle electrical system 177 is used for supplying power to an air conditioning compressor.

The second poles 127, 128 are preferably connected to the interconnection apparatus 58 of the energy storage element 20, the second poles 127, 128 preferably having a sub-group of the modules 40 between them in order to produce a suitable voltage for the high voltage vehicle electrical system 177 by means of the interconnection apparatus 58.

Figure 30:
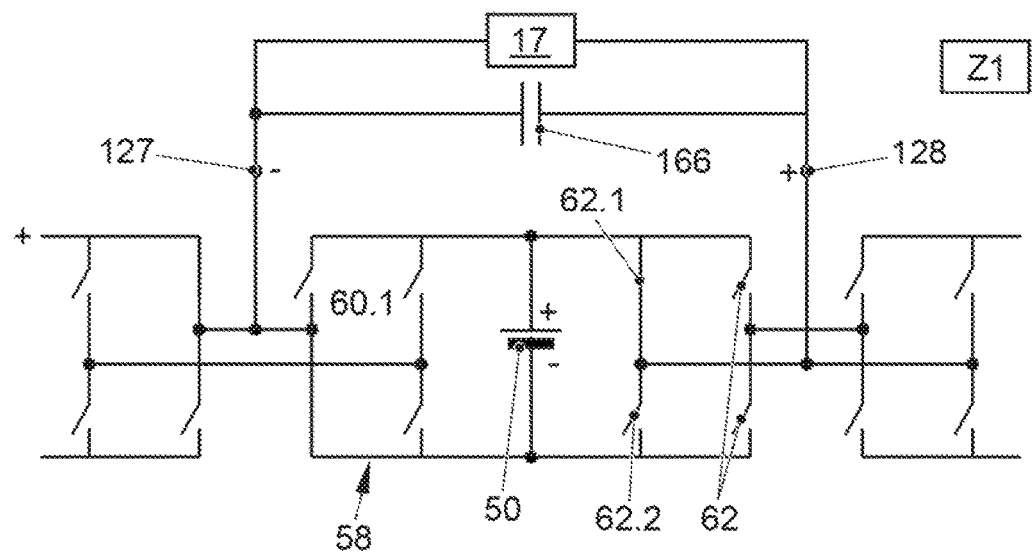
FIG. 30 shows an interconnection between modules in a first state.

FIG. 30 shows an exemplary embodiment for producing the voltage at the second poles 127, 128 using the interconnection apparatus 58. By way of example, the interconnection 60.1 from FIG. 9 has been chosen. Production of the voltage at the second poles 127, 128 is shown by way of example for a series interconnection of the energy storage units 50. In a series interconnection, the positive pole of one energy storage unit 50 is respectively connected to the negative pole of an adjacent energy storage unit 50. On the left-hand side the pole 127 is connected to the upper path, and on the right-hand side the pole 128 is connected to the lower path. In the series interconnection, either only the upper path or the lower path of the connection between the adjacent energy storage units 50 is required. The negative terminal of the energy storage unit 50 is connected to the pole 127 in the interconnection shown, and the positive terminal of the energy storage unit 50 is connected to the pole 128. As a result, the voltage of the energy storage unit 50 is present on a capacitor 166 provided for smoothing and on the battery 17 connected in parallel therewith. This state is referred to as the first state Z1.

Figure 31:
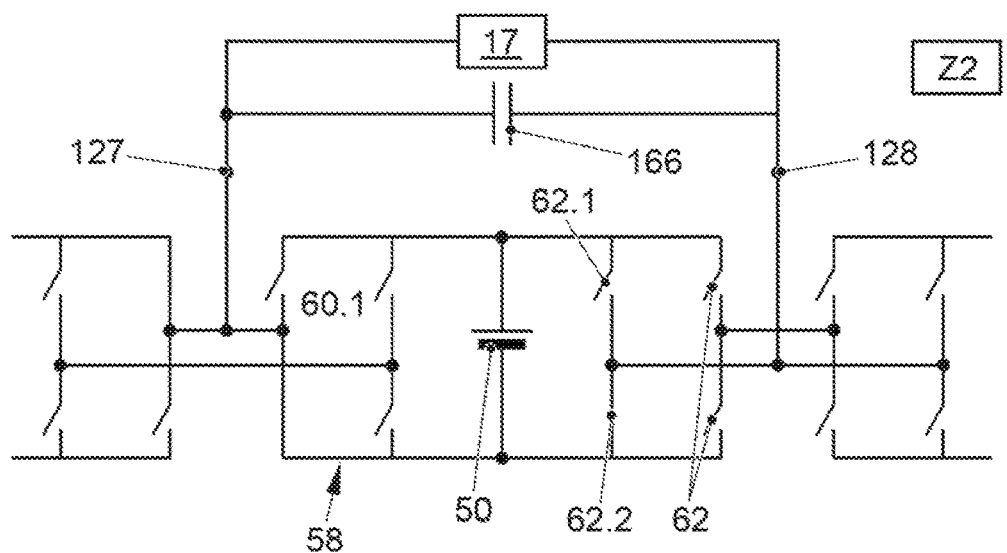
FIG. 31 shows an interconnection between modules in a second state.

FIG. 31 shows the arrangement from FIG. 30 in a second state Z2. In this second state Z2, the energy storage unit 50 is bypassed by virtue of the series interconnection running not via the energy storage unit 50 but rather past the underside thereof. As a result, the voltage of the energy storage unit 50 is not present at the poles 127, 128. In the present interconnection 60.1, the series interconnection can be maintained in a second state Z2 even without bypassing by virtue of the connection being made from the energy storage unit 50 to the right via the upper line. Thus, the lower circuit, to which the second pole 128 is connected, is likewise isolated from the energy storage unit 50. Even in a parallel interconnection of the energy storage units 50, it is possible to connect or not to connect the applicable energy storage unit 50 to the second poles 127, 128. In a parallel interconnection, both the upper and the lower connections are needed, but the interconnection can be made such that the positive path is interconnected either via the upper connection or via the lower connection and the negative path is interconnected via the corresponding other connection.

Figure 32:
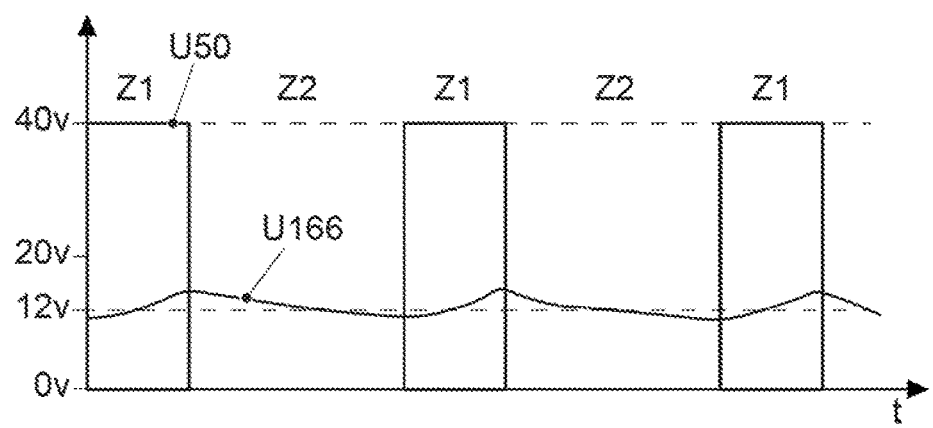
FIG. 32 shows a graph of the voltage obtained in the event of an alternation between the first state and the second state.

FIG. 32 shows the voltage profile U166 on the capacitor 166 by way of example. In the state Z1, the voltage U50 of the energy storage unit 50 is present at the second poles 127, 128, and thus the voltage U166 on the capacitor 166 rises. During the state Z2, the capacitor 166 is not fed by the energy storage unit 50, and thus the voltage U166 falls when the load is connected. Subsequently, there is a change back to the state Z1, etc. Utilization of the interconnection apparatus 58 therefore allows a prescribed voltage to be achieved on average at the second poles 127, 128. Changeover between the first state Z1 and the second state Z2 can be effected using a voltage controller, for example, or generally by means of voltage control.

Figure 33:
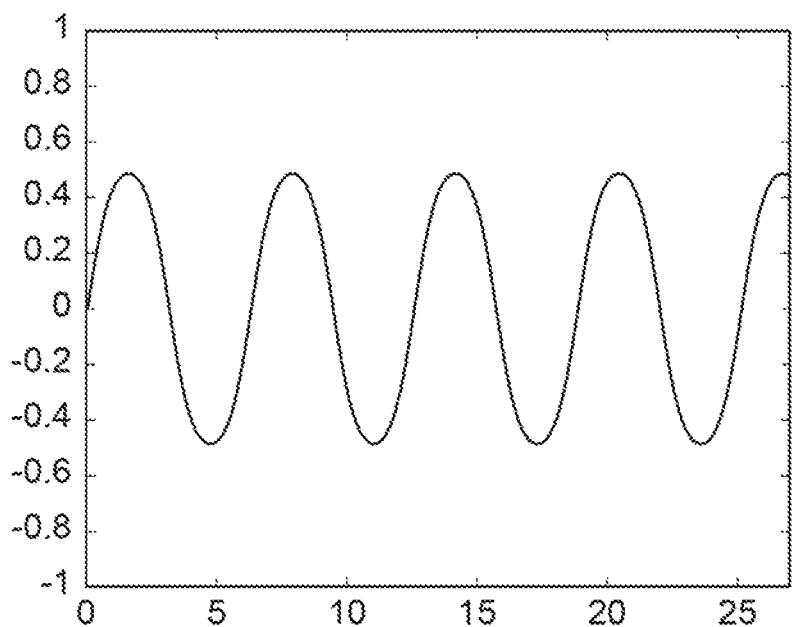
FIG. 33 shows a sinusoidal signal.

FIG. 33 shows a sinusoidal signal, as is preferably generated by the drive inverters 14 for actuating the associated AC motor 12. The drive inverters 14 preferably use a signal generator that uses a resolution of 8 bits and can thus assume 256 different values. At high powers, the drive inverter 14 produces high currents and high voltages at the AC output. It is thus possible for the signal generator to make good use of the existing resolution and to form a suitable sinusoidal signal.

Figure 34:
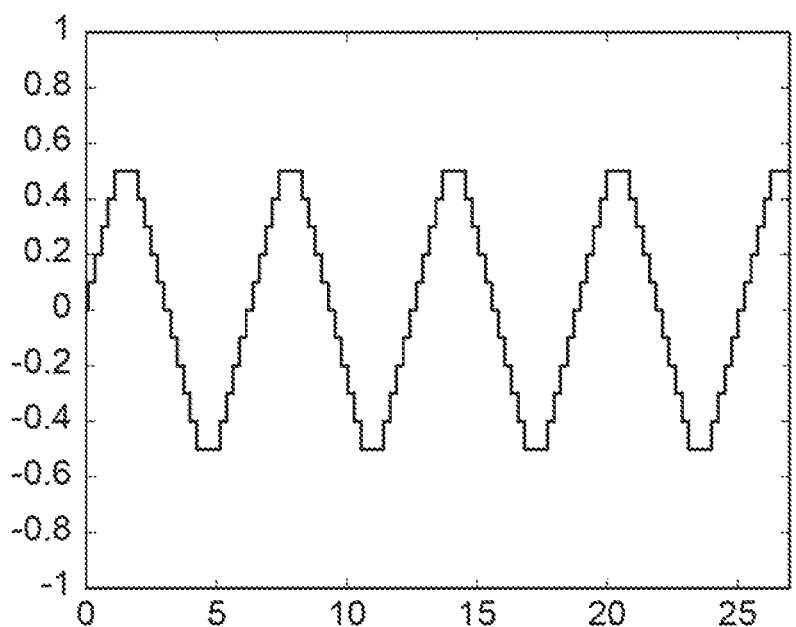
FIG. 34 shows quantized production of the sinusoidal signal from FIG. 33.

FIG. 34 shows the sinusoidal signal from FIG. 33 when the signal generator has only a few levels or a low resolution available. This may be the case, by way of example, if the AC motor 12 requires only little power, for example when parking. In the desired low voltage range, only a few resolution levels of the signal generator are available. In such a case, it is advantageous if the drive inverter 14, as shown in FIG. 13, notifies the second control apparatus 21 that only a low power is needed or that a lower voltage from the energy storage element 20 would be advantageous. The second control apparatus 21 can take into consideration the state data of the other loads in order to determine whether the voltage of the energy storage element 20 can be lowered and if need be can notify the first control apparatus 22 that the voltage of the energy storage element 20 needs to be lowered. In the event of a lower voltage U on the drive inverter 14, better use can be made of the resolution of the signal generator and a good sinusoidal signal can be generated for the phases of the AC motor 12.

In other words, with a very low output voltage from the drive inverter 14, quantization is no longer sufficient to produce a nice sinewave. The drive inverter 14 can then request a lower voltage and operate better therewith. A better output voltage at the phase terminals results in higher efficiency and also in lower distortion.

In the same way, lowering of the voltage U for the drive inverter 14, for example, may be advantageous if it can set the latter to an operating point at which higher efficiency is possible.

Naturally, multiple variations and modifications are possible within the scope of the invention.

The energy storage unit proposed in each case has been one or more battery cells or fuel cells. However, any voltage source is possible in principle.

The data lines cited have been wired data lines. Instead of these, the use of wireless data lines is also possible, either for some or for all of said data lines 30, 24, etc.

What is claimed is:

1. A vehicle comprising an energy storage element, a drive inverter and a charging unit,
said energy storage element comprising a first control apparatus, modules, an interconnection apparatus and two first poles, wherein the drive inverter is connected to the two first poles,
said modules each having an energy storage unit,
said interconnection apparatus having connections between the modules and first switches provided on the connections in order to allow different interconnections of the modules and different voltages at the two first poles based on a state of the first switches,
said different interconnections of the modules allowing at least two interconnections from a group of interconnections comprising: (i) parallel interconnection of two modules, (ii) series interconnection of two modules, and (iii) bypassing of at least one module,
said first control apparatus being configured to actuate the interconnection apparatus based on a voltage setpoint value in order to influence the different voltages at the two first poles based on the voltage setpoint value.

2. The vehicle as claimed in claim 1, wherein the energy storage element has two second poles, the two second poles are connectable to at least one of the energy storage units, wherein a maximum voltage at the two second poles is lower than a maximum voltage at the two first poles.

3. The vehicle as claimed in claim 2, wherein the two second poles are connectable to the at least one energy storage unit via the interconnection apparatus in order to influence the voltage at the two second poles via the first switches of the interconnection apparatus.

4. The vehicle as claimed in claim 3, wherein the first control apparatus is configured to switch the interconnection apparatus alternately to and fro between a first state and a second state, in the first state the two second poles are connected to the at least one energy storage unit such that the at least one energy storage unit brings about a voltage at the two second poles, and in the second state the two second poles are interconnected such that the at least one energy storage unit brings about no voltage or a lower voltage at the two second poles in order to provide, on average, a voltage at the two second poles that is lower than the voltage of the at least one energy storage unit in the first state.

5. The vehicle as claimed in claim 3, wherein the two second poles have a capacitor provided therebetween in order to smooth the voltage at the two second poles.

6. The vehicle as claimed in claim 3 further comprising a first DC/DC converter having first inputs and first outputs, the first inputs are connected to the two second poles either directly or indirectly in order to provide an additional voltage at the first outputs, the additional voltage is lower than the voltage at the two second poles.

7. The vehicle as claimed in claim 6, wherein the first DC/DC converter has an isolating apparatus configured to provide DC isolation between the first inputs and the first outputs, the isolating apparatus includes either a transformer or a capacitor.

8. The vehicle as claimed in claim 6 further comprising a second control apparatus, wherein the drive inverter is connected to the second control apparatus via a first data line and is configured to transmit a first data signal to the second control apparatus, and the second control apparatus is configured to transmit a voltage setpoint value to the first control apparatus based on the first data signal.

9. The vehicle as claimed in claim 8 further comprising a second DC/DC converter having second inputs and second outputs, the second inputs are connected to the two second poles directly or indirectly, the second DC/DC converter is connected to the second control apparatus via a second data line and is configured to transmit a second data signal to the second control apparatus, and the second control apparatus is configured to prescribe a voltage setpoint value for the first control apparatus based on the first data signal and the second data signal.

10. The vehicle as claimed in claim 9, wherein the charging unit has a charging terminal and an AC/DC converter having third inputs and third outputs, the third inputs are connected to the charging terminal, and the third outputs are connected to the two first Poles.

11. The vehicle as claimed in claim 10 further comprising a filter disposed between the third outputs and the two first poles.

12. The vehicle as claimed in claim 10, wherein the charging unit has a current controller and a first measuring apparatus for generating a first signal based on a level of a charging current, the current controller is supplied with a current controller setpoint value as a setpoint value and with the first signal as an actual value, the current controller outputs the voltage setpoint value to the first control apparatus as a manipulated variable in order to regulate an actual value to the setpoint value.

13. The vehicle as claimed in claim 12, wherein the actual value is prescribed based on the voltage at the third outputs.

14. The vehicle as claimed in claim 13, wherein a phase difference between the actual value and the voltage at the third outputs is prescribed in order to influence a power factor.

15. The vehicle as claimed in claim 14, wherein the phase difference is prescribable for the current controller in a manner alterable by an encoder.

16. The vehicle as claimed in claim 10, wherein the AC/DC converter is formed as a result of the drive inverter being used in an opposite direction for a charging process.

17. The vehicle as claimed in claim 16, wherein the charging terminal has a first terminal point for a neutral conductor, and the first terminal point is connected to the two first poles via either diodes or switches.

18. The vehicle as claimed in claim 16, wherein the charging terminal has a first charging terminal unit for a DC voltage and a second charging terminal unit for an AC voltage, the first charging terminal unit is at least partially interconnected with a DC side of the drive inverter, and the second charging terminal unit is at least partially interconnected with an AC side of the drive inverter.

19. The vehicle as claimed in claim 10, wherein the AC/DC converter has four paths in order to allow connection of either a three-phase AC signal or a single-phase AC signal.

20. The vehicle as claimed in claim 10, wherein the AC/DC converter is either an active design or a passive design.

* * * * *